US005688096A

United States Patent [19]

Gagnon et al.

[11] Patent Number: 5,688,096

[45] Date of Patent: Nov. 18, 1997

[54] TRAY FOR CARRYING CONCRETE BLOCKS AND SYSTEM FOR HANDLING AND CURING CONCRETE BLOCKS ADAPTED THERETO

[75] Inventors: Pierre Gagnon, Outremont; Pierre Laforest, Montréal, both of Canada

[73] Assignee: Gestion Laforest Inc., St-Hubert, Canada

[21] Appl. No.: 672,695

[22] Filed: Jun. 27, 1996

Related U.S. Application Data

[63] Continuation of Ser. No. 312,547, Sep. 26, 1994, abandoned.

[51] Int. Cl.$^6$ .................. B65G 1/04; F27B 9/02

[52] U.S. Cl. .................. 414/152; 414/277; 414/286; 108/55.3

[58] Field of Search .................. 414/150, 152, 414/157, 172, 191, 196, 269, 276, 277, 278, 280, 281, 286; 206/322, 386; 108/55.3, 56.3, 157, 180; 425/253–255

[56] References Cited

U.S. PATENT DOCUMENTS

| | | | |
|---|---|---|---|
| 1,009,557 | 11/1911 | Pauly | 414/281 |
| 3,719,288 | 3/1973 | Schmitt et al. | 414/281 X |
| 3,921,540 | 11/1975 | Melnick et al. | 108/55.3 X |
| 4,016,986 | 4/1977 | Thomas | 414/152 |
| 4,338,056 | 7/1982 | Abrahamson et al. | 414/152 |
| 5,304,333 | 4/1994 | Trevino-Gonzales | 425/253 X |

*Primary Examiner*—James W. Keenan
*Attorney, Agent, or Firm*—François Martineau

[57] ABSTRACT

The present invention relates to a tray for carrying a plurality of pallets loaded with several concrete blocks. The tray is a rectangular frame defining an upper surface, front and rear ends and upwardly-projecting flanges at both front and rear ends. The tray is adapted to receive the loaded pallets on its upper surface between the flanges. The invention further relates to a system adapted to carry the loaded tray through a block curing kiln. The kiln is composed of a plurality of longitudinal cells, as is already known, and the pallet-loaded trays are inserted in a consecutive linear abutment fashion in the cells. The relatively high flanges of each tray thus abut on one another, which prevents the overlapping of the trays, and thus prevents the damaging in this way of the concrete blocks. The system for carrying the concrete blocks includes a kiln, a tray loader for loading the pallets on the trays and a tray stripper for unloading them, an elevator-pusher for loading the trays in the kiln and an elevator-puller for unloading them, and a pallet stripper. The system further includes a pallet conveyor for conveying the pallets sequentially from the tray stripper to the pallet stripper, to a molding machine and to the tray loader. The system also includes a tray conveyor for conveying the trays sequentially from the elevator-puller to the tray stripper, to the tray loader and to the elevator-pusher.

15 Claims, 14 Drawing Sheets

TRAY FOR CARRYING CONCRETE BLOCKS AND SYSTEM FOR HANDLING AND CURING CONCRETE BLOCKS ADAPTED THERETO

CROSS REFERENCE DATA

This is a continuation of U.S. application Ser. No. 08/312,547 filed on Sep. 26, 1994 now abandoned.

FIELD OF THE INVENTION

The present invention relates to a system for handling and curing concrete blocks.

BACKGROUND OF THE INVENTION

To obtain hard and solid conventional concrete blocks which can be used in the construction of structures, the blocks must first be molded in the desired shape and then dried until they become hard. When they arrive from molding, the concrete blocks are in a first fresh state in which they are called green blocks and which is characterized, inter alia, by the softness of the blocks. To accelerate the process of drying the green blocks, they are cured, most commonly in a kiln which uses steam. When they exit this kiln, they will be ready to be sent to packaging for eventual use in the construction of a structure.

The conventional kiln possesses a plurality of longitudinal cells in which the blocks are inserted for curing. Of course, if there are more cells in the kiln or if the cells are longer, the kiln will increase its capacity (i.e. the number of blocks cured per unit of time) proportionally. Each cell has an infeed end and a discharge end, opposite one to the other, the former for the in-going green blocks and the latter for the out-going dry blocks. The cells are arranged in rows and columns in a plane perpendicular to their longitudinal axis.

The automatization of the above-described process or system is well known in the art of making concrete blocks. It is known to use conveyors transporting pallets on which the concrete blocks are set after being molded, and the blocks rest on these pallets during the whole process of being carried from the molding machine to the kiln, then from the kiln to a pallet stripper where the blocks are separated from their respective pallets and then sent to packaging. These pallets are thin rectangular, steel plates which can receive a set number of blocks per pallet, e.g. three blocks per pallet. These pallets, once loaded with the concrete blocks, are conveyed to the kiln and pushed inside the cells one after another. A cell has its width slightly larger than the width of a pallet (and its corresponding blocks), therefore allowing a consecutive linear abutment of the pallets in the cell. When a pallet is inserted in a cell, it pushes the first pallet already in the cell and consequently all the pallets in this cell, the other pallets in the cell thus longitudinally moving a distance equal to the length of one pallet towards the discharge end of the kiln.

The main problem existing in this system is related to the pallets. Indeed, the pallets, due to their thinness, often overlap one another because of their linear relative position and because they are pushed one against the other with enough pressure to move all the pallets of one cell. When such overlapping occurs, the green blocks are likely to collide on one another, thus damaging themselves because of their relative softness before curing. This is of course highly undesirable since the shape of the green blocks is to be kept intact and constant from one block to the other.

Also, since the blocks are relatively soft when exiting the molding machine, it would be very difficult, if not impossible, to manipulate the concrete blocks directly without damaging them. This means that the pallets, or a similar device, are almost indispensable.

OBJECTS OF THE INVENTION

It is an object of this invention to provide a system for conveying concrete block pallets loaded with concrete blocks to and from a kiln.

Another object of this invention is to provide a system that will avoid the pallets from overlapping one another.

Yet another object of this invention is to provide a tray for carrying the pallets adapted to such a system.

SUMMARY OF THE INVENTION

The present invention is a tray for carrying a number of concrete block loaded pallets and a system for curing the concrete blocks and for handling the tray.

More particularly, the invention is the combination of a concrete blocks handling and curing system and a plurality of trays for carrying rectangular pallets loaded with concrete blocks Each of the trays of the present invention comprises a rectangular frame having a longitudinal axis and defining a flat upper surface, two sides and two ends, end flanges upstanding from said upper surface along said ends, said end flanges defining complementary outer surfaces normal to said longitudinal axis and to said frame, said tray dimensioned to receive on said upper surface a set number of pallets in side by side and contiguous positions and retained by said end flanges in said positions.

Preferably, each tray further includes side flanges upstanding from the sides of the frame.

Preferably, said frame has a number of throughways equal to said number of pallets and each exposing the underside of one of the pallets carried by said tray.

The handling and curing system comprises:

a) a tray loader, for loading a set number of said pallets on each of said trays;

b) a kiln, for curing said concrete blocks;

c) kiln loading means, for loading said trays into Said kiln;

d) kiln unloading means, for unloading said trays from said kiln;

e) a tray stripper, for unloading said pallets from said tray; and f) conveying means, for carrying said trays sequentially from said kiln unloading means to said tray stripper, to said tray loader and to said kiln loading means.

Advantageously, said tray loader comprises:

a) first accumulating means for accumulating said set number of pallets in contiguous fashion;

b) first elevating means vertically movable between a first position and a second position, adapted to spacedly carry said trays and said pallets and deposit the latter in the former;

c) first loading means, for loading said set number of pallets from said first accumulating means onto said first elevating means;

d) first retractable tray holding means, for holding said tray in an intermediate position between said first and second positions of said first elevating means, said first tray holding means being retractable from the vertical path of said tray carried by said first elevating means; and e) first transfer means, for transferring said tray full of pallets from said first elevating means to said first conveying means.

Preferably, said tray stripper comprises:

a) second accumulating means for accumulating said set number of pallets in an adjacent fashion and discharging said pallets in a spaced consecutive constant fashion;

b) second elevating means vertically movable between a first position and a second position, adapted to spacedly carry said tray and said pallets;

c) second loading means, for loading said set number of pallets from said second elevating means onto said second accumulating means;

d) second retractable tray holding means, for holding said tray in an intermediate position between said first and said second positions of said second elevating means, said second tray holding means being retractable from the vertical path of said tray carried by said second elevating means; and e) second transfer means, for transferring said tray loaded with said set number of pallets onto said second elevating means.

Preferably, each of said first and second elevating means define a relatively flat base and a number of blocks equal to said set number of pallets, said blocks extending upwardly relative to the plane of said base and being fixedly anchored thereto, said blocks being adapted to pass through said throughways of said tray frame for abutting on said pallets, said base being adapted to support said tray under said pallets.

Preferably, said kiln defines a plurality of rows and columns, the intersection between one of said rows with one of said columns defining a cell, said cell being correctly dimensioned for longitudinally receiving a plurality of said trays carrying pallets loaded with concrete blocks, said kiln further defining an infeed end and a discharge end for respectively inserting and discharging said trays into said cells.

Advantageously, said kiln loading means are adapted to receive one of said trays at a regular time interval and to load it into a first selected cell, said kiln loading means comprising an elevator-pusher having a generally vertical truss frame movable along said kiln infeed end, a tray elevator vertically movable along said truss frame and pushing means installed on said tray elevator, said tray elevator being adapted to pick up and vertically carry said one tray, said elevator-pusher positioning said one tray in front of said first selected cell, said pushing means inserting said one tray into said first selected cell.

Preferably, said kiln unloading means are adapted to unload one of said trays at a regular time interval from a second selected cell and to dispatch it onto said conveying means, said kiln unloading means comprising an elevator-puller having a generally vertical truss frame movable along said kiln discharge end, a tray elevator vertically movable along said truss frame and pulling means installed on said tray elevator, said tray elevator positioning said pulling means in front of said second selected cell, said pulling means pulling said tray from said second selected cell onto said tray elevator, said tray elevator vertically carrying and discharging said tray onto said conveying means.

Advantageously, said kiln columns have a plurality of vertically stacked doors, one of said doors corresponding to each one of said cells at each one of said infeed and discharge ends, said elevator-pusher including door opening means which can open one of said doors at said infeed end corresponding to said first selected cell before said pushing means insert said tray into said first selected cell.

Preferably, said elevator-puller includes door opening means which can open one of said doors at said discharge end corresponding to said second selected cell before said pulling means retrieve said tray from said second selected cell.

Preferably, said elevator-puller further includes retaining wheels for engaging vertical rails fixedly anchored to said kiln, said retaining wheels retaining said elevator-puller from tilting towards said kiln when said pulling means retrieve said tray from said second selected cell.

Preferably, said elevator-pusher further includes retaining wheels for engaging vertical rails fixedly anchored to said kiln, said retaining wheels retaining said elevator-pusher from tilting away from said kiln when said pushing means insert said tray into said first selected cell.

Figure 1:
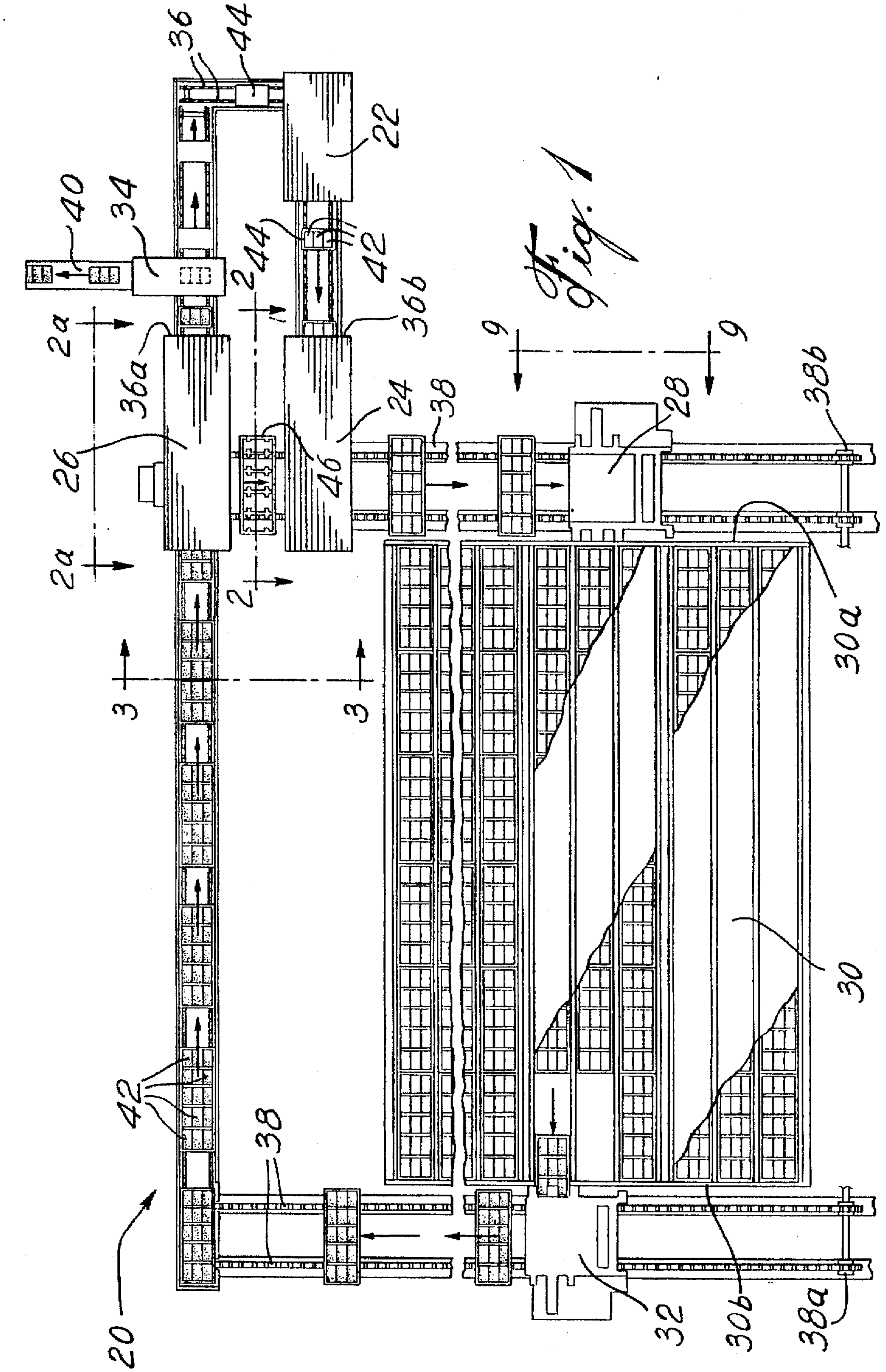
FIG. 1 is a partial fragmented schematic top plan view of the concrete block handling and curing system according to the invention.
Figure 2:
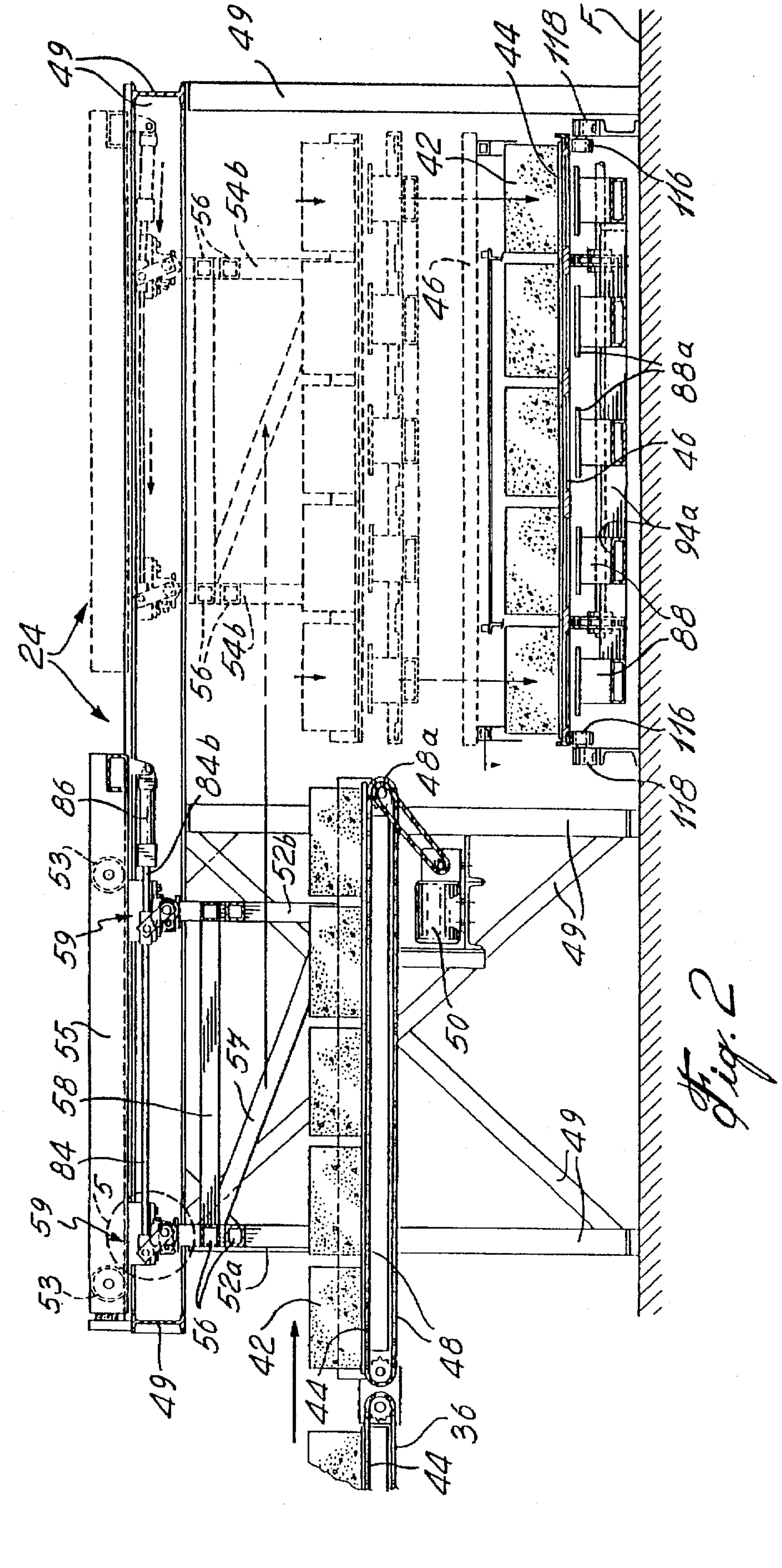
FIG. 2 is a side elevation, taken along line 2—2 of FIG. 1, of the tray loader, sequentially suggesting the positions occupied by the pallets and blocks before and after they are loaded on a tray.
Figure 3:
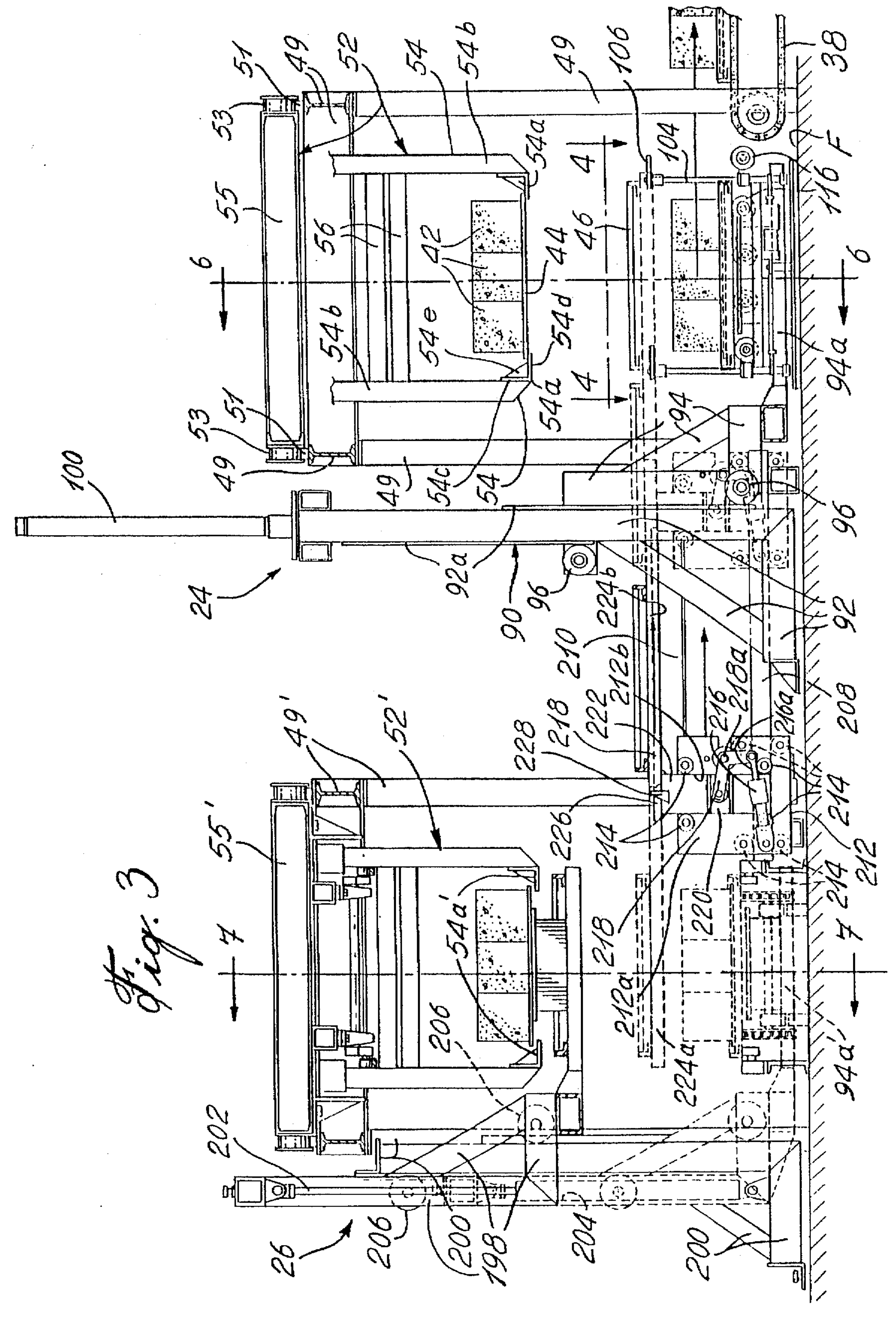
Figure 5:
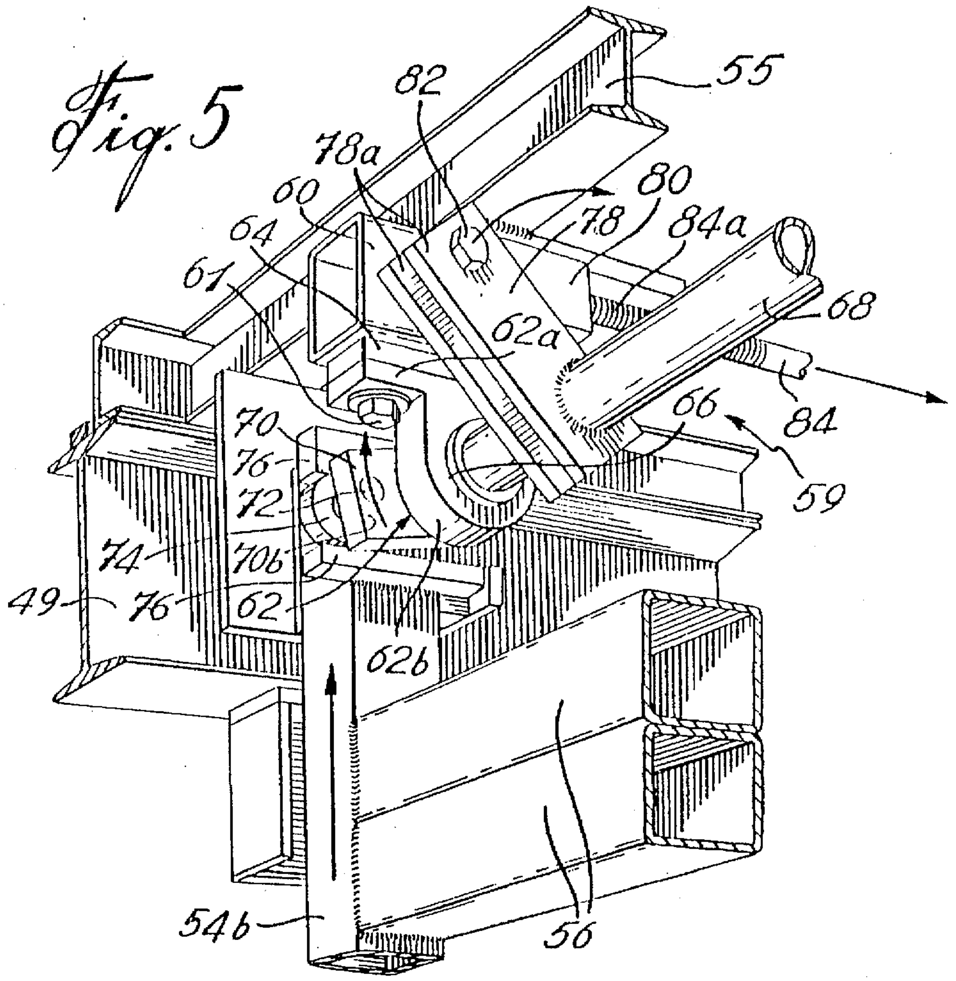
Figure 4:
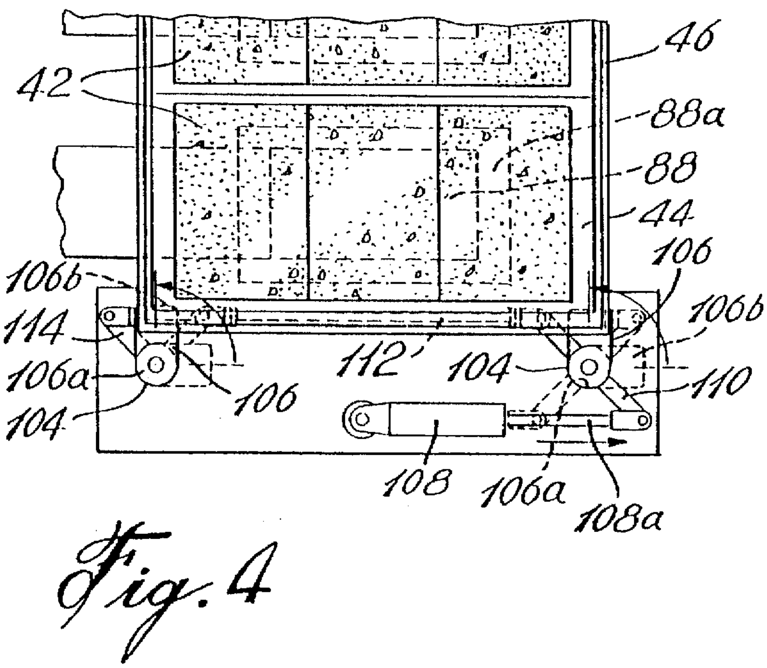
Figure 6:
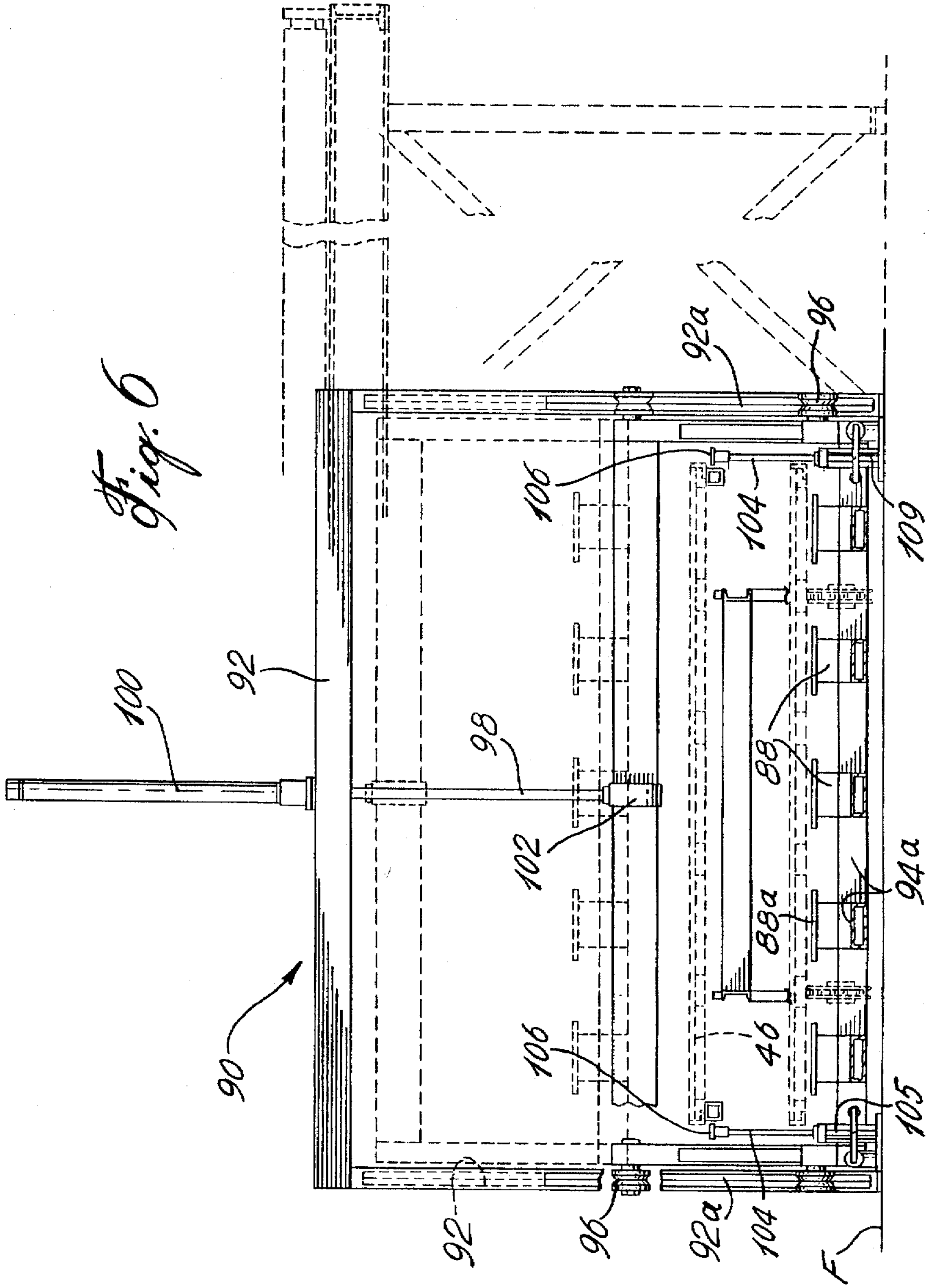
Figure 7:
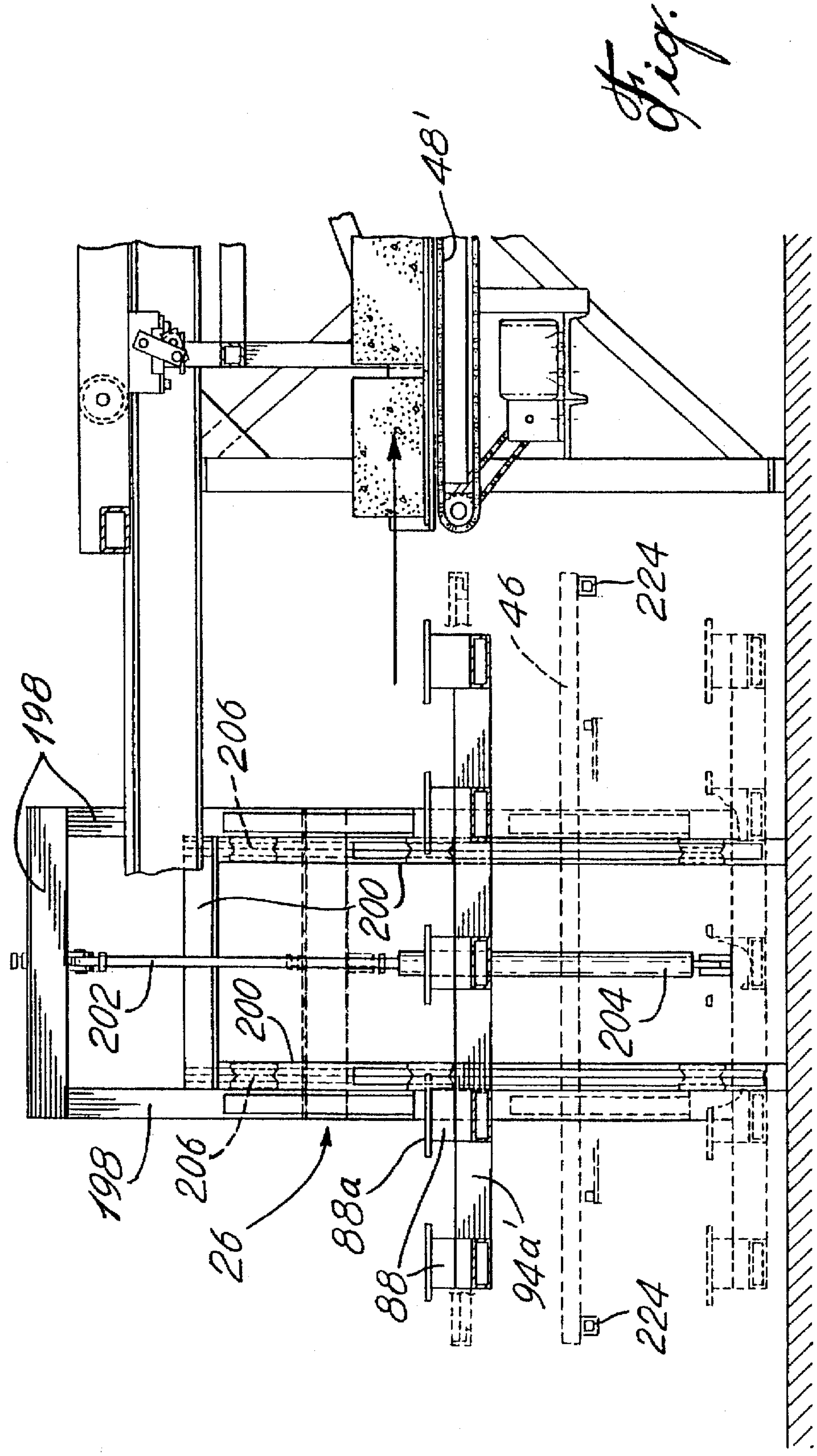
Figure 8:
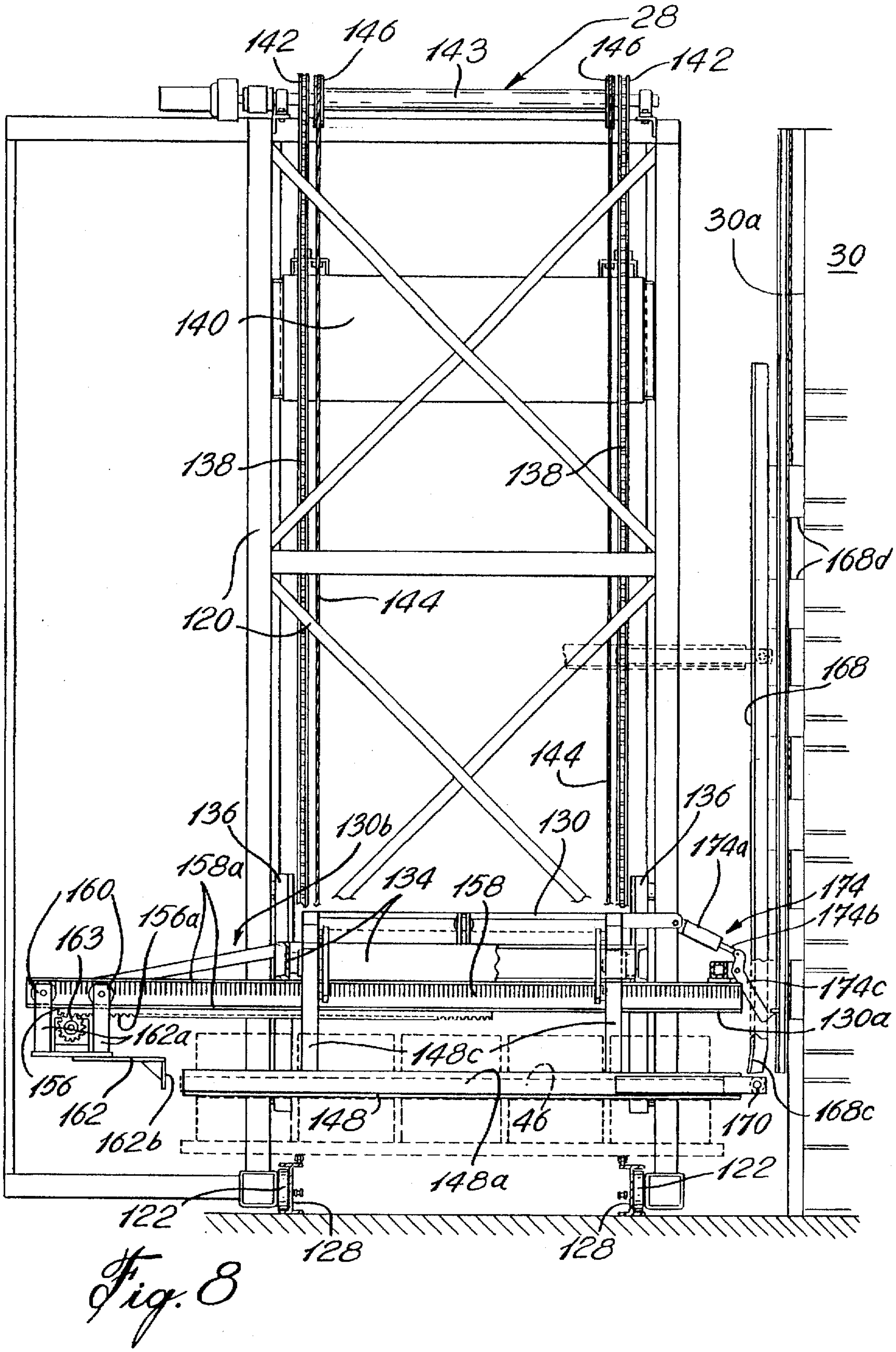
Figures 9, 9A:
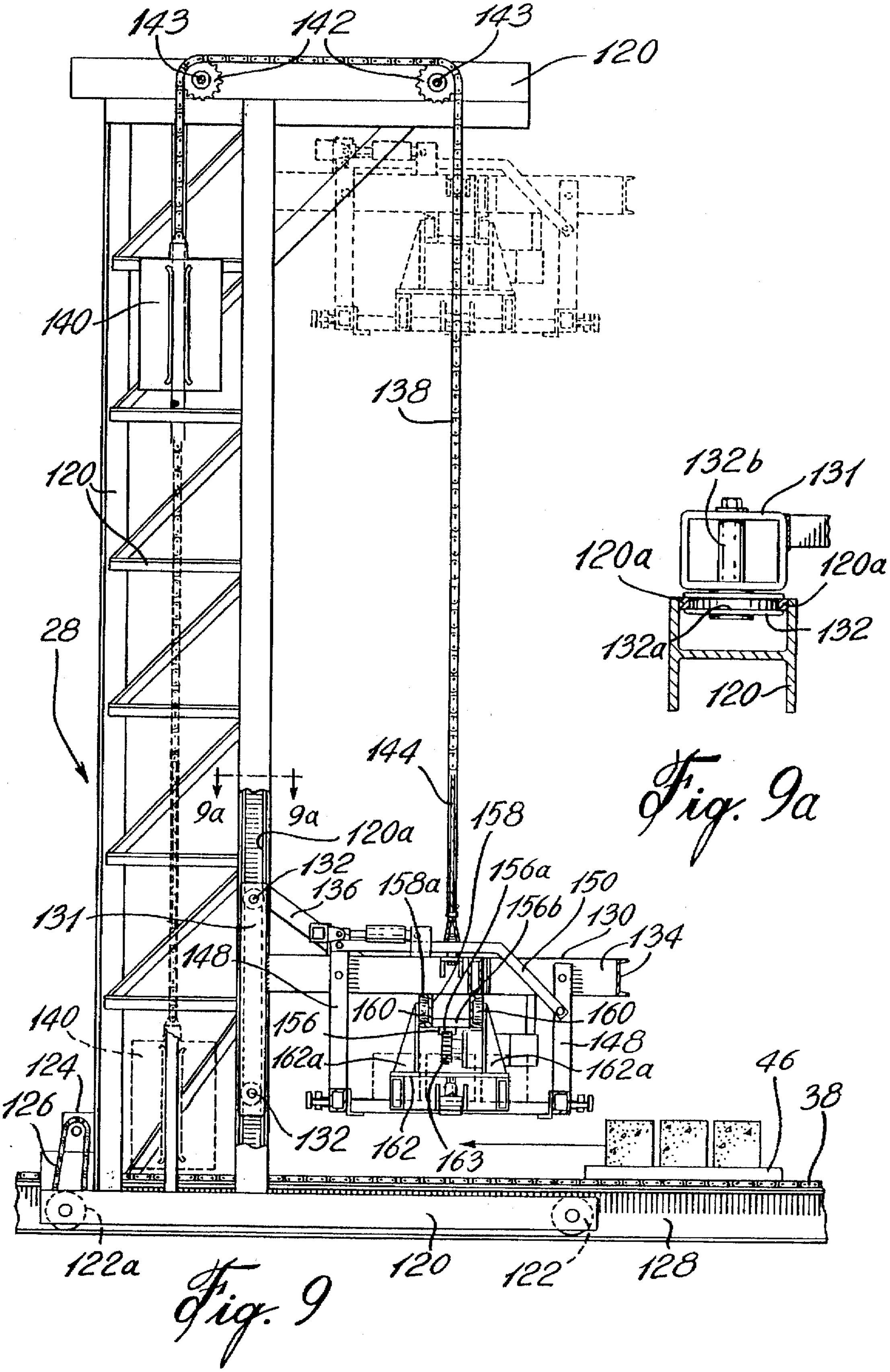
Figure 10:
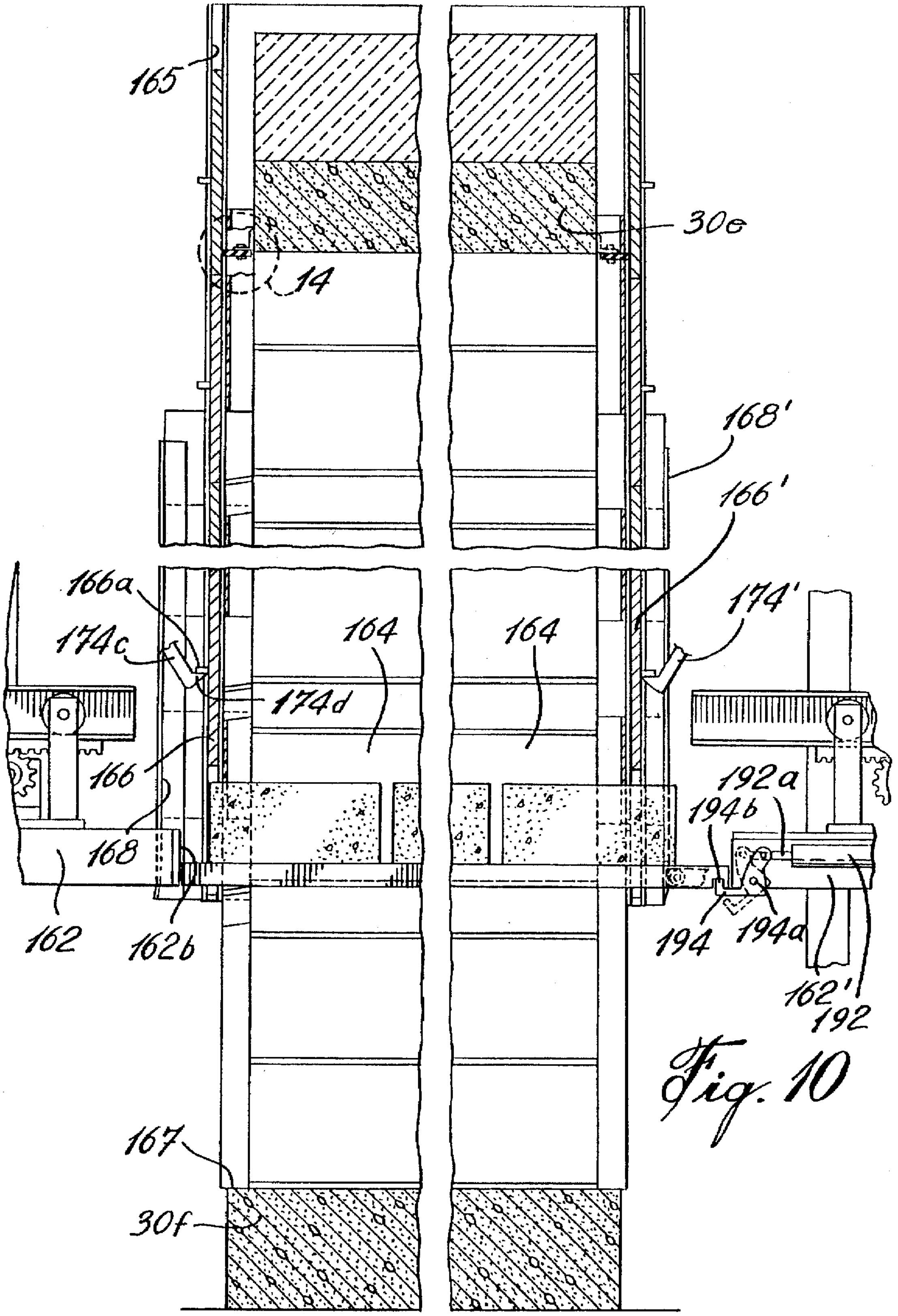
Figure 11:
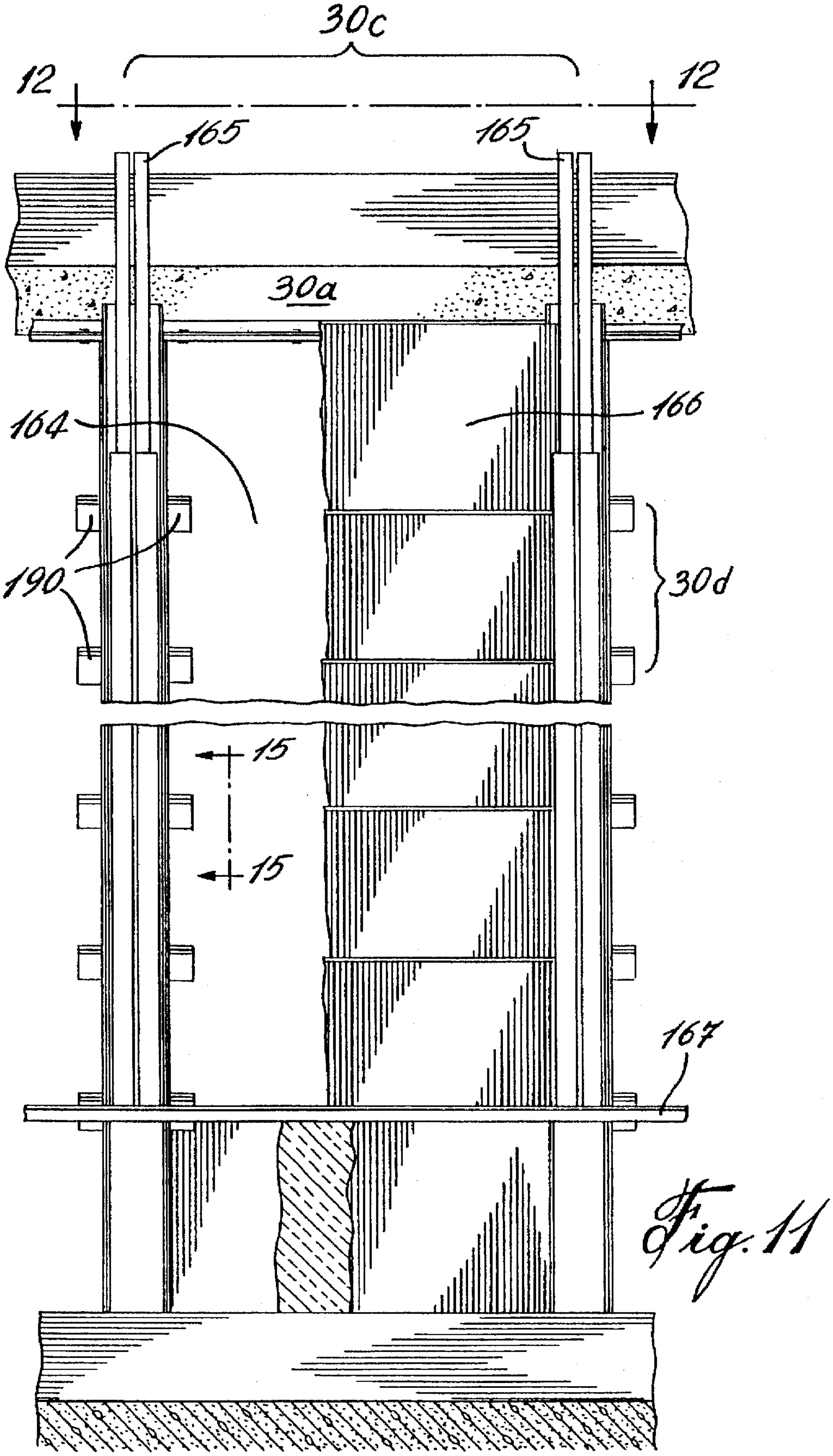
Figure 13:
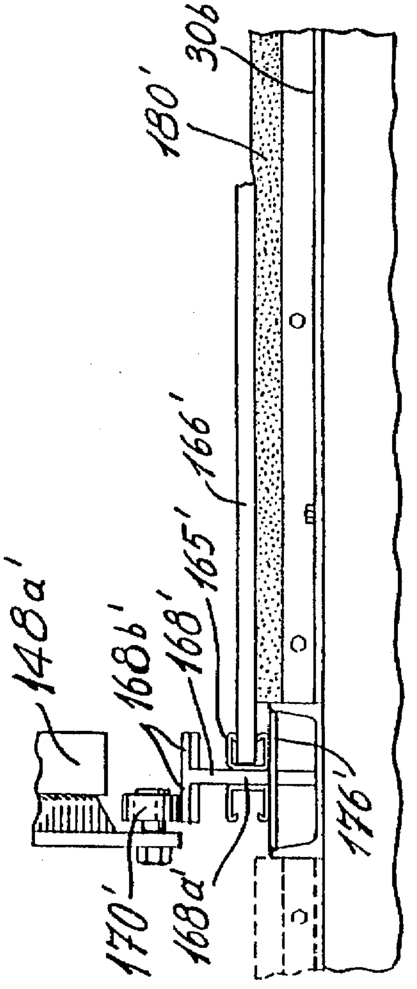
Figure 12:
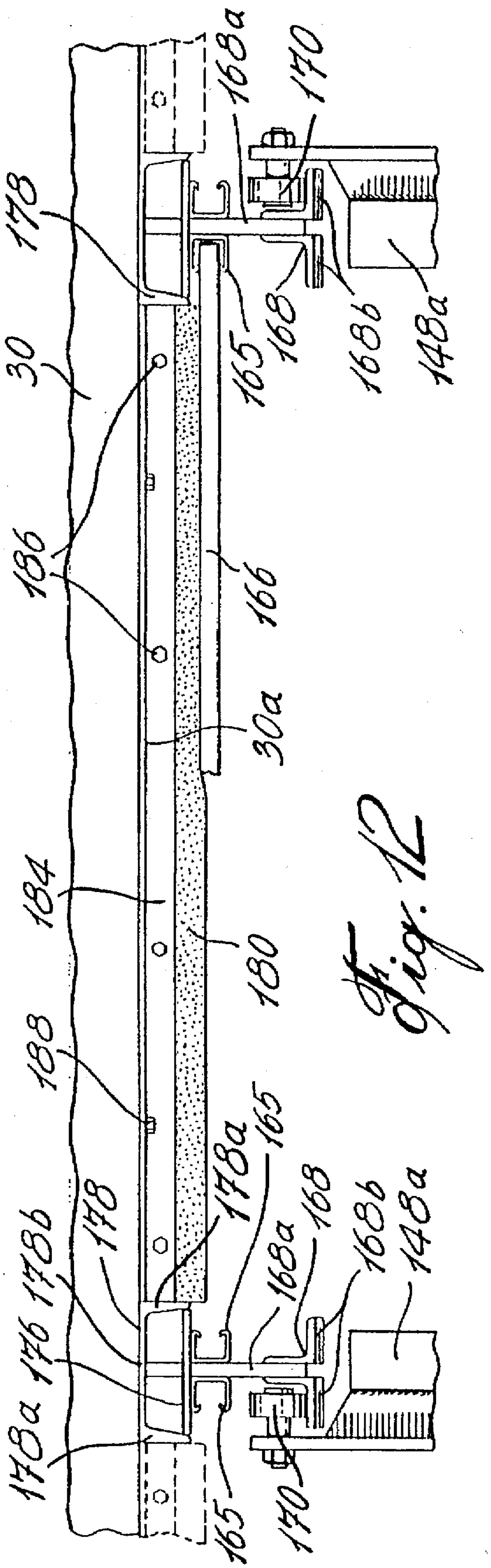
Figure 16:
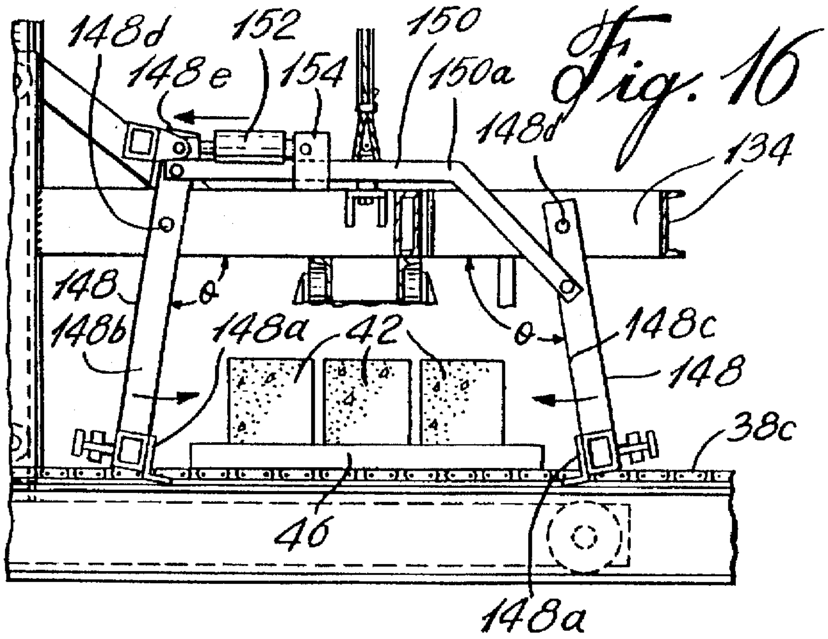
Figure 15:
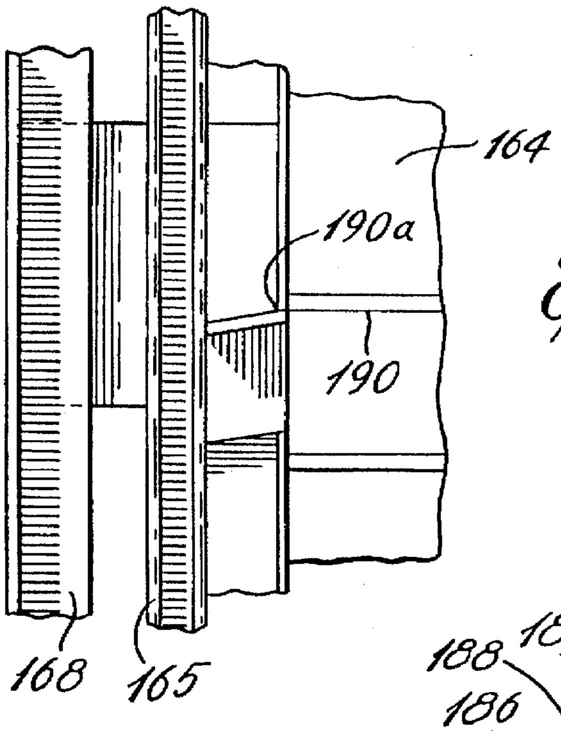
Figure 14:
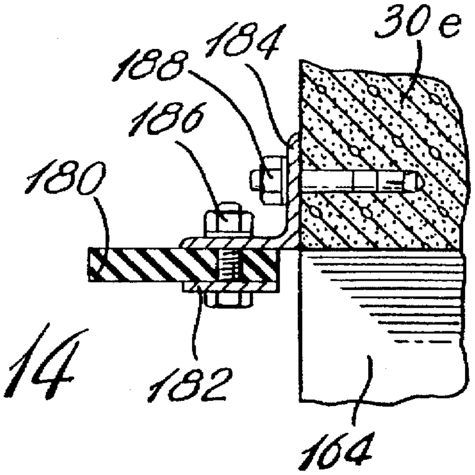
Figure 17:
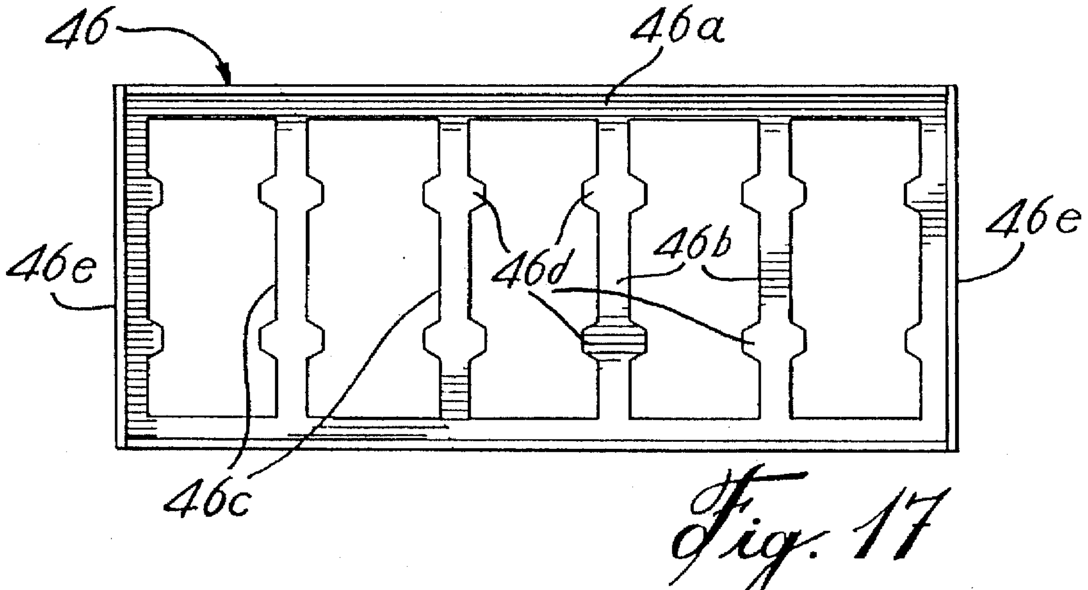

FIG. **2*a* is a side elevation, taken along line 2*a*—2*a* of FIG. 1**, of the tray stripper, sequentially suggesting the positions occupied by the pallets and blocks before and after they are unloaded from a tray;

FIG. 3 is an end view, taken along line 3—3 of FIG. 1, of, from left to right, the tray stripper, the tray conveyor and the tray loader;

FIG. 4 is partial top plan view, at an enlarged scale, taken along line 4—4 of FIG. 3, suggesting:

a) in dotted lines the pallets under the concrete blocks; and b) two sequential positions of the tray holder, one of which is in dotted lines;

FIG. 5 is a perspective view, at an enlarged scale, of the area circumscribed in the circle 5 of FIG. 2, suggesting with arrows the movement of several parts accomplishing the lifting of the pallets;

FIG. 6 is a partial cross-sectional view taken along line 6—6 of FIG. 3, suggesting two positions of the block elevator stripped of pallets and blocks;

FIG. 7 is a partial cross-sectional view taken along line 7—7 of FIG. 3, suggesting two positions of the block elevator stripped of pallets and blocks; FIG. 8 is a side elevation of the elevator-pusher of the system of FIG. 1;

FIG. 9 is an elevation view, taken along line 9—9 of FIG. 1, of the elevator-pusher, with a partial cut-away showing the guide wheels of the elevator-pusher;

FIG. **9*a* is a cross-sectional view, taken along line 9*a*—9*a* of FIG. 9**, at an enlarged scale;

FIG. 10 is a partial fragmented vertical section of the kiln, illustrating particularly the kiln infeed and discharge ends and showing the engagement to the former and the latter of the elevator-pusher and the elevator-puller, respectively;

FIG. 11 is a partial fragmented elevation view of the kiln infeed end, showing in cut-away the refractory material;

FIG. 12 is a partial top plan view, at an enlarged scale, taken along line 12—12 of FIG. 11;

FIG. 13 is a partial top plan view, at an enlarged scale, of the kiln discharge end;

FIG. 14 is a side elevation, at an enlarged scale, of the area circumscribed in circle 14 of FIG. 10;

FIG. 15 is a partial sectional view, at an enlarged scale, taken along line 15—15 of FIG. 11;

FIG. 16 is a partial elevation view, at an enlarged scale, of the elevator-pusher of FIG. 9, suggesting with arrows the movement of the elevator-pusher jaws;

FIG. 17 is a top plan view of the tray used in the invention; and

Figure 18:
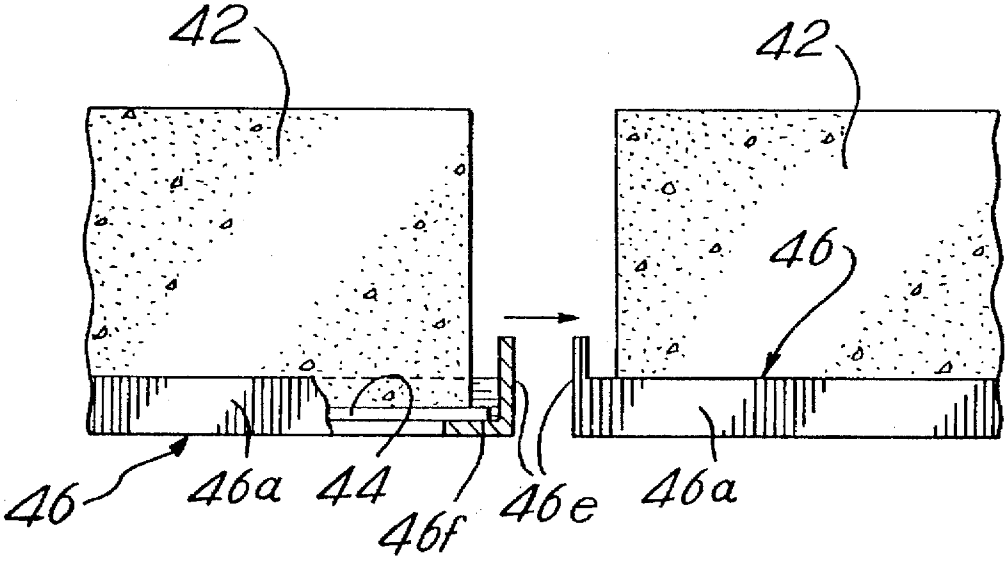

FIG. 18 is a partial cut-away side elevation of two trays loaded with pallets and concrete blocks, suggesting with an arrow the relative movement of the trays.

DETAILED DESCRIPTION OF THE INVENTION

The present invention comprises many elements which interact to form a handling and curing system for concrete blocks. The blocks, as explained in the background of the invention, need to be taken from a molding machine to a kiln, for curing, then from the kiln they will be sent to packaging.

The system accomplishes a cycle repeatedly. The system cycle begins when the freshly molded soft blocks, or green blocks, exit the molding machine on pallets by groups of three (though this number is not restrictive). The pallets are rectangular relatively thin plates, preferably made of wood, dimensioned to receive three green blocks on its upper surface. The pallets are carried on a pallet conveyor of known construction until they reach a tray loader. At this point, the pallets are loaded by the tray loader on elongated metallic or aluminium trays by groups, e.g. groups of five, to be carried on a tray conveyor to an elevator-pusher. This elevator-pusher will pick up each of the trays one at a time and insert it inside a predetermined cell in the kiln infeed end. Each cell is correctly dimensioned for longitudinally receiving a plurality of trays which gradually push on the next tray in a linear longitudinal fashion as trays are inserted in one cell and then another. The elevator-pusher will insert a tray inside every other cell before it returns to a particular cell to insert another one. This means that the blocks on a tray will remain a relatively long time inside the kiln before they are ready to be retrieved at the discharge end of the kiln, opposite the infeed end, and that every block will remain the same time inside the kiln. This allows the blocks enough time to be correctly cured by the kiln, advantageously by hot steam jets. An elevator-puller pulls the trays out of the kiln cells at the same speed as the elevator-pusher inserts them, to maintain a constant number of trays in the kiln. Of course, before a tray is inserted in a cell, the tray adjacent the discharge end of the kiln must be previously pulled out to make room for the new in-coming tray.

Once a tray is pulled out by the elevator-puller, it is deposited on the tray conveyor (though at an upstream position relative to the position where the pallets are loaded on the trays) and conveyed to the tray stripper. There, the pallets are taken from the trays and transferred to the pallet conveyor (again at an upstream position relative to where the blocks exiting the molding machine are set on the pallets), the pallet conveyor carrying the pallets to the pallet stripper. The now dry (and consequently hard) concrete blocks are retrieved from the pallets and are conveyed through the instrumentality of a dry block conveyor to a packaging area.

Both the empty trays and empty pallets continue on their respective conveyor to return to their starting point to receive once again a group of concrete blocks ready for curing.

This ends the system cycle. The time it takes to complete a full system cycle is determined by the time it takes to cure the concrete blocks. Indeed, it takes a certain predetermined time to cure the blocks from green to dry state which depends on the kiln being used. The elevator-pusher and the elevator-puller work at a steady rhythm, which will be determined by the curing time of the blocks. The blocks will progress in their respective cell at the speed imposed by the two elevators, since they load the cells with trays. The block molding machine could slow up the process if it were not fast enough to produce blocks for the kiln, especially if the kiln has a great capacity, but it is advantageous to have a molding machine which can feed the kiln with green blocks fast enough.

The novelty of this invention resides in the trays that are used for loading the block-loaded pallets in the kiln. These elongated trays comprise at both of their extremities flanges projecting perpendicularly and upwardly from their base for widthwise abutment of one tray on the other in the kiln cell. These flanges will ensure that the trays do not overlap one another as the relatively thin pallets would potentially do when pushed one on the other. The abutment of the trays is ensured by the flanges, which are of a height sufficient to permit a stable abutment and no overlapping of the trays. Also, the system must be adapted to the trays by incorporating a tray loader, a tray stripper, a tray conveyor, and a kiln, an elevator-pusher and an elevator-puller capable of manipulating the trays.

Now referring to the annexed drawings, wherein identical numerals refer to identical elements, FIG. 1 shows a concrete block handling and curing system 20 comprising a concrete block molding machine 22, a tray loader 24, a tray stripper 26, an elevator-pusher 28, a kiln 30 having an infeed end **30*a* and a discharge end 30*b*, an elevator-puller 32 and a pallet stripper 34. A pallet conveyor 36 sequentially joins tray stripper 26, pallet stripper 34, molding machine 22 and tray loader 24. A tray conveyor 38 sequentially joins elevator-puller 32, tray stripper 26, tray loader 24 and elevator-pusher 28. The two conveyors therefore define upstream ends 36*a*, 38*a* and downstream ends 36*b*, 38*b*. The arrows of FIG. 1 show the direction in which each conveyor carries the concrete blocks, consequently suggesting the upstream and downstream ends of both conveyors 36, 38. Also, both pallet conveyor 36 and tray conveyor 38** are of conventional construction, being adapted and correctly dimensioned to carry pallets and trays (both described hereafter), respectively. They are composed of endless chains, which can allow the continual functioning of the conveyors.

A third conveyor, the dry block conveyor 40, originates at pallet stripper 34 and extends to the packaging area (not shown).

As explained before, conventional green concrete blocks are deposited on the upper surface of (preferably) thin, rectangular steel pallets, as is known in the art. These pallets are dimensioned to receive a set number of blocks, e.g. three blocks 42 per pallet 44, as illustrated in FIGS. 1 and 3. Blocks 42 are placed in an adjacent fashion on pallet 44, their longitudinal axis being widthwisely oriented on pallet 44. There is a peripheral edge free of any blocks on pallet 44, to avoid blocks 42 from being damaged during the process of handling and curing them.

Pallets 44 are loaded for curing in elongated rectangular light trays 46, made of a steel alloy. These trays 46 are dimensioned to receive a set number of pallets, e.g. five pallets per tray, as shown in FIGS. 1 and 2. Pallets 44 are placed in an adjacent fashion in tray 46, their longitudinal axis being widthwisely oriented in tray 46. The length of tray 46 is slightly longer than the length of the five adjacent pallets 44. The loading of pallets 44 in tray 46 is described hereafter.

Pallets 44, each loaded with three green concrete blocks 42, arrive from concrete block molding machine 22 in a constant consecutive spaced manner on pallet conveyor 36, as is already known.

Pallet conveyor 36 conveys pallets 44 to tray loader 24, as stated previously. FIG. 2 shows that pallets 44 are discharged from pallet conveyor 36 on a pallet accumulator-conveyor 48, of similar construction but which runs at a slower speed than pallet conveyor 36. Pallets 44 will abut one against the other on accumulator-conveyor 48 since its speed is slower, until five pallets are consecutively adjacent to one another. The speed of accumulator-conveyor 48, relative to the speed of conveyor 36, is therefore determined to allow the fifth pallets 44 to come in contact with the four others at the exact moment when the first of the five pallets 44 reaches the free extremity 48*a* of accumulator-conveyor 48. The speed of accumulator-conveyor 48 is controlled with an independent motor 50, shown under accumulator-conveyor 48 in FIG. 2.

The speed at which blocks 42 that are discharged from conveyor 36 abut against blocks 42 that are on accumulator-conveyor 48 is relatively slower than if the latter were motionless, which helps to avoid a collision leading to the overlapping of the pallets 44 on one another. This is, of course, extremely desirable, since concrete blocks 42 are to be kept intact and such overlapping of pallets 44 would likely lead to the breakage of blocks 42. To give accumulator-conveyor 48 a non-zero speed that will result in the above-described effect is thus advantageous.

Tray loader 24 comprises an elongated main frame 49 (FIGS. 2 and 3) which stably and securingly rests on the floor F. Tray loader main frame 49 generally forms an inverted U in end view (FIG. 3), its two extremities perpendicularly resting on floor F, and it thus defines a longitudinal through-way, inter alia allowing the passage of pallets 44 and trays 46. Its length is slightly longer than the length of two trays 46 end on. On top of main frame 49 are two spaced longitudinal rails 51, 51 (FIG. 3) allowing the back and forth movement of a movable pallet holder 52. Indeed, pallet holder 52 comprises a rectangular horizontal support frame 55 which rests on rails 51, 51 through the instrumentality of two pairs of carrying wheels 53 rotatably attached to support frame 55.

Pallet holder 52 defines an upstream end 52*a* and a downstream end 52*b*, the line created therewith being longitudinally parallel to accumulator-conveyor 48 and to tray loader main frame 49, upstream end 52*a* being upstream and downstream end 52*b* being downstream relative to the block flow direction on accumulator-conveyor 48. As shown on FIG. 3, pallet holder 52 defines an inverted U-shaped cross-section, each of the legs 54 thereof composed of an elongated upholding member 54*a* parallel to accumulator-conveyor 48 and integrally mounted at the lower ends of a pair of spaced vertical support beams 54*b*, 54*b*. Pallet holder 52 further defines two pairs of crossbars 56, each of them fixedly and transversely linking support beams 54*b* by pairs at upstream and downstream ends 52*a*, 52*b* of pallet holder 52, crossbars 56 being perpendicular to support beams 54*b* (as illustrated in FIG. 3 which shows downstream end 52*b*). Also, two longitudinal bars 58, 58 (FIG. 2) fixedly and longitudinally link support beams 54*b* by pairs, one at upstream end 52*a* to one at downstream end 52*b*, each longitudinal bar 58 being parallel to its corresponding upholding member 54*a* and positioned almost directly over it. Two diagonal bars 57, 57 (FIG. 2) fixedly and diagonally link support beams 54*b* by pairs for an increased torsional stiffness of pallet holder 52. Upholding members 54*a*, crossbars 56, diagonal bars 57 and longitudinal bars 58 therefore confer a structural integrity to pallet holder 52.

Elongated upholding member 54*a* is formed of two straight plates 54*c*, 54*d* defining a right angle (in cross-section) inwardly and upwardly oriented, relative to tray loader main frame 49, as illustrated in FIG. 3. Outer plate 54*c* of upholding member 54*a* is to be vertical and fixedly anchored (e.g. by welding) to the inner surface of the lower extremity of support beams 54*b*. Lower plate 54*d* of upholding member 54*a* is to be horizontal and is adapted to bear on pallets 44 with its upper surface and hold them when pallet holder 52 rises. Upholding member 54*a* comprises also a reinforcement crosspiece 54*e* that joins lower plate 54*d* to outer plate 54*c* for reinforcing the assembly.

FIG. 2 illustrates that support beams 54*b* are attached at their upper extremity to pallet holder support frame 55 by four spaced lifting means 59 (two of which are shown in FIG. 2) which are positioned near the four corners of support frame 55. FIG. 5 shows that each lifting means 59 are composed of a short attachment piece 60 that is securingly bolted with two bolts 61, 61 to pallet holder support frame 55, together with a shaft support 62. Shaft support 62 is under attachment piece 60, and they are separated by a plate 64 for increased reliability of the assembly. Shaft support 62 defines a flat base with two flanges 62*a* through which bolts 61 are riveted; shaft support 62 bears by its base on the lower surface of plate 64. Shaft support 62 further defines a semi-cylindrical lower portion 62*b* that is pierced with a bore 66 correctly dimensioned to axially and rotatably be engaged by a shaft 68. The bore 66 and shaft 68 junction is preferably greased for a rotation of shaft 68 hampered by as little friction as possible. Shaft 68 is parallel to crossbars 56 and spacedly positioned over them. Each shaft 68 is symmetrically shared by two identical lifting means 59, on one side and the other of pallet holder support frame 55.

Each of the extremities of shaft 68 outwardly protrudes from its corresponding shaft support 62 to fixedly engage (e.g. by means of weld points) a first short thin rectangular rotation plate 70 near its first end (not shown) through a bore adapted for that purpose. Near its second end 70*b* (FIG. 5), first rotation plate 70 is rotatably engaged by a short shaft 72 that also rotatably engages a small bored plate 74 which is fitted between two bearing plates 76, 76 positioned over and under bored plate 74. These bearing plates 76, 76 are fixedly anchored to support beams 54*b* (e.g. with weld points).

Inwardly spaced from shaft support 62, relative to main frame 49, is fixedly anchored (e.g. by welding) a second rotation plate 78 composed of two thin rectangular plates 78*a*, 78*a*. Plates 78*a*, 78*a* are spaced by a rectangular rod support 80 that is bolted with a bolt 82 near its first extremity between plates 78*a*, 78*a* and thicknesswisely bored at its second extremity. Bolt 82 permits free rotation around its axis of rod support 80 relative to second rotation plate 78. A cylindrical pull-rod 84 is fixedly anchored to rod support 80 at its first extremity 84*a*, e.g. pull-rod 84 can be threaded at its end portion and engage complementary threads in the bore of rod support 80.

FIG. 2 shows that pull-rod 84 engages another rod support 80 near the downstream end of pallet holder 52, and that both rod supports 80 will pivot simultaneously so as to keep pull-rod 84 always horizontal. On the other side of this second rod support 80 is another shorter pull-rod 84*b* that engages a pivotable and electrically controlled hydraulic jack 86. Jack 86 is fixed on the periphery of pallet holder support frame 55 at downstream end 52*b* of pallet holder 52 and is oriented towards upstream end 52*a*. Hydraulic jack 86 may be activated through electrical controls which are relayed from a control panel, either manually or automatically operated. There is one such hydraulic jack 86 on one side and the other of pallet holder support frame 55, the two jacks 86, 86 being always synchronized in their movements.

Pallet holder 52 can vertically move between two positions, a lower and an upper positions. To lift pallet holder 52 from its lower position to its upper position, hydraulic jack 86 must be activated. It pulls pull-rod 84 (FIG. 5) which makes second rotation plate 78 rotate (clockwisely, as indicated by the arrow in FIG. 5) through the instrumentality of rod support 80. Since second rotation plate 78 is integrally fixed to shaft 68, the latter comes into rotation also, the two of them rotating around shaft 68 axis. Shaft 68 induces its movement to first rotation plate 70 which upwardly lifts bored plate 74 and consequently supports beams 54*b*, as suggested by the arrow in FIG. 5. Of course, the lifting of support beams 54*b* result in the lifting of upholding members 54*a*.

Since accumulator-conveyor 48 is narrower than the length of pallets 44, the extremities of the latter widthwisely extend beyond accumulator-conveyor 48. While pallets 44 are accumulating on accumulator-conveyor 48, pallet holder 52 moves upstream until they are over accumulator-conveyor 48 (FIG. 2 in full lines), lower plate 54*d* of upholding member 54*a* positioning itself directly under the protuberant extremities of pallets 44. Once five pallets 44 are consecutively adjacent, as illustrated in FIG. 2, pallet holder 52 is lifted to its upper position and it therefore lifts the five pallets 44 by their extremities (FIG. 3), enough to free pallets 44 from any contact with accumulator-conveyor 48 and consequently stopping the movement of the five pallets 44 along accumulator-conveyor 48. Pallet holder 52 then moves downstream until it is no more over accumulator-conveyor 48 (FIG. 2 in dotted lines), and pallet holder 52 is afterwards lowered to its lower position.

Of course, from the moment pallet holder 52 moves downstream with pallets 44, other pallets 44 start accumulating again on accumulator-conveyor 48 since the flow from pallet conveyor 36 is constant.

To allow pallet holder 52 to move upstream to retrieve another group of five pallets, five support blocks 88 (one for each pallet 44) lift pallets 44 slightly to free them from any contact with upholding members 54*a*. Pallet holder 52 can therefore move upstream over five other pallets 44 to pick them up.

To lift pallets 44, tray loader 24 comprises a lift apparatus 90 (illustrated in FIGS. 3 and 6). Lift apparatus 90 is composed of a vertical rectangular lift frame 92 that is steadily anchored to floor F (e.g. by means of bolts) and is longitudinally positioned along tray loader main frame 49, though its length is half the length of main frame 49. A vertically movable block elevator 94 (FIG. 3) is installed on lift frame 92. Block elevator 94 is kept on its course along vertical rails 92*a* on lift frame 92 through the instrumentality of guide wheels 96. FIG. 6 shows that a cylinder rod 98 engages a hydraulic cylinder 100. Cylinder rod 98 is fixedly anchored to block elevator 94 by means of a lock ring 102 and block elevator 94 can thus be vertically moved when cylinder rod 98 pulls it upwardly or downwardly.

A rectangular block base 94*a* is integrally linked to block elevator 94 and extends into the through-way, defined in tray loader main frame 49, downstream from pallet accumulator-conveyor 48 and is free to move vertically at this position, as shown in FIGS. 2 and 6, between a first lower position (shown in full lines) and a second upper position (shown in dotted lines). The lower position of block elevator 94 brings the block base 94*a* lower surface at floor level and the upper position of block elevator 94 brings support blocks 88 upper surface level with accumulator-conveyor 48 upper surface.

Support blocks 88 are fixedly anchored to block base 94*a* upper surface, as shown in FIGS. 2 and 6, and each define an integral thin rectangular support plate 88*a* at their upper surface. Block base 94*a* and support blocks 88 are correctly positioned for support plates 88*a* to bear upon the lower surfaces of pallets 44 when block elevator 94 moves upwardly from its lower position to its upper position and when pallet holder 52 is positioned at its downstream position (consequently over block elevator 94).

As suggested in FIG. 4, the surface of support plate 88*a* is larger than that of support block 88, to improve the equilibrium of the pallet on the support block 88, once it rests upon it.

FIGS. 2, 3 and 6 suggest that a tray 46 is positioned at an intermediate position between block elevator 94 lower and upper positions. It is held thereto by a tray holder (FIGS. 3 and 6) that defines four vertical rotatable sustaining rods 104, each equipped at its upper extremity with a transversal generally rectangular finger 106 defining a fixed end 106*a* (FIG. 4) and a free end 106*b*, fixed end 106*a* being rounded, and finger 106 being integrally fixed to its corresponding sustaining rod 104 by its fixed end 106*a*. Tray 46 is sustained at its four corners by free ends 106*b* of fingers 106 (they are then inwardly oriented, as will be explained later).

FIG. 4 shows an electrically controlled hydraulic jack 108 whose jack rod 108*a* is rotatably attached, at its extremity opposite jack 108, to the first extremity of a pivoting arm 110, the latter fixedly attached at its mid-portion to the bottom extremity of a first sustaining rod 104 of a widthwise pair of sustaining rods 104, 104. Pivoting arm 110 second extremity is rotatably attached to a link member 112 that synchronizes a short pivot 114 with the movements of pivoting arm 110. Short pivot 114 is attached at its first extremity rotatably to link member 112 and at its second extremity fixedly to the second sustaining rod 104 of said widthwise pair.

Therefore, when jack rod 108*a* is pulled in from its drawn position (illustrated in full lines in FIG. 4), it pivots pivoting arm 110 around its sustaining rod 104 axis and transmits simultaneously the same pivoting movement to short pivot 114 around its corresponding sustaining rod 104 axis. Both sustaining rods 104 are consequently rotated in the process because of their attachment to either pivoting arm 110 or short pivot 114. The length of jack rod 108*a* is adapted to rotate both sustaining rods 104 of a 45þ angle when it is moved completely in or out by hydraulic jack 108. This rotation will cause fingers 106, 106 to rotate in unison, their free ends 106*b*, 106*b* being oriented either inwardly (as illustrated in full lines in FIG. 4) or longitudinally (as suggested in dotted lines in FIG. 4), relative to tray loader main frame 49. A second hydraulic jack 108, and all the components attached thereto, have an identical mirror image counterpart, as illustrated in FIG. 6, lengthwisely opposed to the other, relative to lift frame 92. FIG. 6 also shows that sustaining rods 104 are anchored to floor F by anchoring sleeves 109 which allow the free rotation of sustaining rods 104 around their respective axes.

When block elevator 94*a* moves from its lower position to its upper position, block base 94*a* bears on tray 46 lower surface and carries it upwards, tray 46 being positioned in a plane under the level of plates 88*a*. FIG. 17 shows that tray 46 is correctly dimensioned and adapted to be engaged through its structure by support blocks 88, being composed of a flat peripheral frame 46*a* and four flat cross bars 46*b*. It therefore defines through-ways 46*c* for the passage of support blocks 88. Block base 94*a*, however, is correctly dimensioned to receive tray 46 on its upper surface, tray 46 resting on its cross bars 46*b*. Also, peripheral frame 46*a* and cross bars 46*b* have a sufficient width to peripherally hold pallets 44, and frame 46*a* and cross bars 46*b* further define a plurality of lips 46*d*, transversally protruding in through-ways 46*c*, that ensure the holding of pallets 44 when they are in tray 46. Preferably, peripheral frame 46*a* will have lateral upwardly-projecting flanges that prevent pallets 44 from sliding in tray 46.

Block elevator 94 moves upwards to its upper position and thus lifts pallets 44 (which then rest on support blocks 88) from pallet holder 52 and, once upholding members 54*a* have moved (upstream) from under pallets 44, block elevator 94 moves downwards to its lower position. To let tray 46 pass without hindering its course and since they were inwardly oriented to hold tray 46, fingers 106 will move from their inward position to their longitudinal position, activated by hydraulic jack 108.

Before block elevator 94 lower surface reaches floor level, tray 46 extremities land on two spaced sets of longitudinally aligned (relative to elongated tray 46) rollers 116 (FIGS. 2 and 3) and tray 46 stays at that level, between said lower position of block elevator 94 and said intermediate position of said tray 46. The two sets of rollers 116 are spaced from one another of a distance greater than the length of block base 94*a* but smaller than the length of tray 46. Rollers 116 are rotatably anchored to longitudinal roller supports 118 that are fixedly anchored to floor F (e.g. by means of bolts). Pallets 44 will lower until they land on tray 46, on which they will rest. Block base 94*a* will reach floor level, thus vertically clearing tray 46 level.

Rollers 116 are electrically controlled to spin when activated, so as to convey tray 46 in the direction of tray conveyor 38 (FIG. 3). They will do so when block base 94*a* has reached floor level. Rollers 116 are spaced from one another so as to keep tray 46 stable at all times, e.g. there could be five rollers 116 for each set as suggested in FIG. 3. Moreover, tray conveyor 38 is positioned close to the last roller 116, to allow a steady passage of tray 46 from rollers 116 to tray conveyor 38.

FIG. 1 illustrates that trays 46 loaded with pallets 44 are conveyed towards elevator-pusher 28 on tray conveyor 38. Once it reaches elevator-pusher 28, tray 46 is lifted by it to be inserted into a kiln cell.

FIGS. 8 and 9 show that elevator-pusher 28 is composed of a generally vertical truss frame 120 mounted on a set of four wheels 122, 122, 122*a*, 122*a*. Driving wheels 122*a* are linked to an electrical motor 124 (FIG. 9) through the instrumentality of a driving chain 126. Wheels 122, 122*a* are guided by rails 128 that are parallel and adjacent to tray conveyor 38. Truss frame 120 is therefore movable along tray conveyor 38, in a course parallel to kiln infeed end 30*a* and spaced from it, though almost adjacent to it.

Tray elevator 130 is vertically movable along truss frame 120. Tray elevator 130 defines an adjacent end 130*a* adjacent to kiln infeed end 30*a*, an opposite end 130*b* opposite kiln infeed end 30*a* (relative to truss frame 120) and a longitudinal axis linking adjacent end 130*a* and opposite end 130*b*.

Tray elevator 130 comprises a pair of guide bars 131, 131 (FIG. 9) that are each equipped with a pair of guide wheels 132 that engage a vertical rail 120*a* on truss frame 120. FIG. 9*a* shows how each guide wheel 132 defines a peripheral groove 132*a* that rotatably engages complementary straight vertical rails 120*a*, 120*a* that protrude axially, relative to guide wheels 132, from vertical frame 120. Rails 120*a*, 120*a* imprison guide wheel 132 to allow only a vertical movement of the latter.

A rectangular horizontal elevator frame 134 is perpendicularly attached to guide bars 131 and is oriented opposite truss frame 120. Reinforcement bars 136, 136 angularly link elevator frame 134 to guide bars 131 (e.g. 45þ angle between the two) to reinforce the elevator frame 134—guide bars 131 assembly.

Two chains 138 are fixedly attached near each of the adjacent and opposite ends 130*a*, 130*b* of tray elevator 130 on the upper surface of elevator frame 134. Each chain 138 is fixedly anchored at its second extremity to a balance-weight 140 (there is one balance-weight 140 for the two chains 138) and hangs from—and is engaged by—a pair of cogwheels 142 whose teeth prevent chain 138 from sliding on it. Each pair of cogwheels 142 has its cogwheels coaxially, fixedly and spacedly attached to one of two rotatable cogwheel shafts 143, 143 at the uppermost portion of truss frame 120. One of the two cogwheel shafts 143, 143 is electrically controlled. Chain 138 is engaged in its intermediate portion by cogwheels 142, so that both its extremities hang spacedly from one another, tray elevator 130 and balance-weight 140 consequently not interfering with one another in their opposite vertical movements, i.e. their respective trajectories do not intersect one another.

Security cables 144, 144 are provided to hold tray elevator 130 to balance-weight 140 in case one or both chains 138 rupture. Each security cable 144 hangs from a pair of fixed spaced grooved pulleys 146, 146, each of the latter being adjacent and coaxial to one of the cogwheels 142 and having similar dimensions to those of cogwheels 142.

To move tray elevator 130 upwards or downwards, cogwheel shaft 143 is rotated correspondingly. Chains 138 and security cables 144 therefore lift or lower tray elevator 130 and simultaneously lower or lift balance-weight 140. Tow positions of tray elevator 130 are shown in FIG. 9, on of which is in dotted lines, with the corresponding position of balance-weight 140. Balance-weight 140 is preferably approximately the same weight as tray elevator 130 to facilitate the task of the motor rotating cogwheel shaft 143, for it will counter-balance the weight of tray elevator 130.

FIGS. 8, 9 and 16 show that two pivoting jaws 148 depend downwardly from elevator frame 134. FIGS. 8 and 16 illustrate that jaws 148 define two elongated spaced grip members 148*a* that are each fixedly anchored (e.g. with bolts) to the lower extremity of a pair of support bars 148*b*, 148*c*. Support bars 148*b*, 148*c* are pivotally attached to elevator frame 134 by short pivoting shafts 148*d*. Grip members 148*a* can therefore pivot transversally (relative to their longitudinal axis) around pivoting shafts 148*d* (FIG. 16). Grip members 148*a* each have a L-shaped cross-section, the bottom segment being adapted to hold a tray 46 on its upper surface.

A link bar 150 (FIG. 16) is rotatably attached to the protuberant extremity 148e of the closest support bar 148*b* to truss frame 120, thus over pivoting shaft 148*d*. Link bar 150 is positioned generally transversally to support bar 148*b*, and it defines an elbow 150*a* that permits its attachment to the other support bar 148*c* under pivoting shaft 148*d*. An electrically controlled hydraulic jack 152 is rotatably fixed at one end to support bar **148*b* directly over link bar 150 attachment and at the other end to a fixing piece 154 which is anchored near the mid portion of link bar 150. Hydraulic jack 152, when activated, will therefore pivot jaws 148 between a first closed position and a second opened position. In closed position of the jaws 148 form a right angle with elevator frame 134 (FIG. 9) while in opened position they form a small obtuse angle þ with elevator frame 134 (FIG. 16**).

FIGS. 8 and 9 show that elevator-pusher 28 also defines an elongated toothed feed rack 156 whose teeth **156*a* are positioned lengthwisely under its main body 156*b*, the latter being generally rectangular and flat in cross-section (FIG. 9). Feed rack 156 is positioned under elevator frame 134 along tray elevator longitudinal axis, under the two chains 138, 138. It is fixedly and spacedly anchored (e.g. welded) to two side rails 158, 158 that are themselves fixedly anchored to elevator frame 134 lower surface. Each rail 158 defines outwardly projecting perpendicular flanges 158*a* that permit a stable engagement of four support wheels 160 between them. Support wheels 160 support a pusher frame 162 which is generally U-shaped in cross-section (FIG. 9), support wheels 160 being rotatably fixed to the four legs 162*a* thereof. Pusher frame 162 is movable along feed rack 156 through the instrumentality of a rack cogwheel 163 whose teeth are complementary to feed rack teeth 156*a* and are adapted to engage the latter. Rack cogwheel 163 is electrically controlled to move pusher frame 162 along feed rack 156**.

Pusher frame 162 has a flat end pusher surface **162*b* that is positioned to bear on tray 46 near opposite end 130*a* of tray elevator 130 when tray 46 is in the position shown in FIG. 8. Thus, when pusher frame 162 advances towards kiln 30 due to the forward movement of rack cogwheel 163, it will push tray 46 towards kiln infeed end 30*a***.

FIG. 9 shows that a tray 46 arrives on tray conveyor 38 towards elevator-pusher 28 and passes unavoidably under tray elevator 130. Preferably, elevator-pusher 28 moves to intersect tray 46 at the column of kiln 30 in which tray 46 is to be inserted. FIG. 16 shows that tray elevator 130 will open its jaws 148 when tray 46 is under them, and will then close them on it, grip members **148*a* stably upholding tray 46 (and consequently concrete blocks 42). Tray elevator 130 will then be lifted, by the rotation of cogwheel shaft 143, with tray 46, up to the row in which tray 46 is to be inserted, thus positioning tray 46** in front of the desired cell, which must be a cell with at least one empty space at its discharge end.

Kiln infeed end **30*a* is partially shown on FIG. 11. It is composed of a plurality of columns 30*c* and rows 30*d*, the intersection of the two forming the opening to a cell 164. Each column 30*c* has a pair of vertical laterally-spaced elongated door rails 165, 165 adjacent the two sides of the cells 164 of that column 30*c*. Rectangular flat doors 166 engage door rails 165 in a vertical consecutive abutment so that a door 166 corresponds to each cell 164. Door 166 defines a relatively small orthogonally projecting flange 166*a* (FIG. 10) positioned on the mid-portion of its exterior surface (relative to kiln 30). The free engagement of doors 166 allow them to be independent from the ones under them. Indeed, if a door 166 is lifted to permit access to its corresponding cell 164, only the ones over it will be lifted also, the ones under it remaining undisturbed. The doors on the bottom row abut against a kiln flange 167 (FIGS. 10 and 11**) adapted for that purpose.

FIG. 10 shows that kiln 30 defines an upper refractory layer **30*e* and a lower refractory layer 30*f* that insulate it from the exterior. Side refractory layers (not shown) are also provided for the same reason. Kiln flange 167 rest on lower layer 30*f***.

Kiln infeed end **30*a* is further equipped with elongated vertical rails 168 (FIGS. 8 and 12) that define a T-shaped cross-section having a web 168*a* and two flanges 168*b*. Web 168*a* is orthogonally attached to kiln infeed end 30*a* between door rails 165 (FIG. 12). One rail 168 is positioned between each column of kiln 30. The lower extremity of rails 168 is outwardly elbowed at 168*c*, as illustrated on FIG. 8. This elbow 168*c* allows retaining wheels 170 to more easily upwardly engage rails 168. Retaining wheels 170 are rotatably fixed at adjacent end 130*a* of tray elevator 130 on grip members 148*a*. When tray elevator 130 moves upwards, retaining wheels 170 longitudinally engage rails 168** for reasons explained hereafter.

Tray elevator 130 will immobilize at the level of the desired cell 164. FIG. 8 shows that elevator-pusher 28 includes a door opening device 174 comprising an electrically controlled hydraulic cylinder **174*a* whose cylinder rod 174*b* is linked to a handle 174*c* rotatably fixed at its intermediate portion to elevator frame 134, handle 174*c* free end thus being able to pivot upwardly or downwardly under the control of hydraulic cylinder 174*a*. FIG. 10 illustrates that handle 174*c* has a small outwardly oriented (relative to tray elevator 130) finger 174*d* at its free end correctly dimensioned and adapted to upwardly engage flange 166*a* of door 166. When hydraulic cylinder 174*a* is activated, cylinder rod 174*b* is pulled and door 166 is upwardly moved to permit access to cell 164**.

It is important to note that when door 166 is opened, each of the other doors 166 over the one being opened and in the same column **30*c* are moved upwards so as to close the upper adjacent cell 164, as suggested in FIG. 10. This is highly desirable, for only one cell 164 will have its opening uncovered at any given time, at kiln infeed end 30*a*, which results in less heat loss inside kiln 30. Also, FIGS. 10 and 11 show that door rails 165 upwardly extend beyond the last cell 164 of column 30*c*, to allow the corresponding last door 166 to move upwards when any door is lifted in its column 30*c*. The doors 166** under the one being opened are left undisturbed.

Door rails 165 are spaced from kiln 30 proper to permit free vertical sliding movement of doors 166. FIG. 12 shows that door rails 165 are fixedly attached to a vertical fixing plate 176, the latter fixedly attached to the two flanges **178*a*, 178*a* of a U-shaped channel 178. Longitudinal web 168*a* of T-shaped rail 168 passes through fixing plate 176 and is fixed to the web 178*b* of channel 178. Preferably, web 168*a* of rail 168 is interrupted by regularly spaced holes 168*d* (FIG. 8) to allow fixing plate 176** to be stably fixed.

As shown in FIG. 12, to insulate kiln 30 at its upper periphery, an elastomeric seal (e.g. rubber) 180 is installed between each channel 178, elastomeric seal 180 being able to withstand the heat inside kiln 30 and to undergo (at least) slight elastic deformations. FIGS. 12 and 14 show that elastomeric seal 180 is securingly attached between a bolting plate 182 and an angle iron 184 with a plurality of equally spaced bolts 186. Angle iron 184 is in turn securingly attached to upper refractory layer **30*e* with a plurality of equally spaced screws 188. Elastomeric seal 180 is compressed by the doors 166 of the upper row 30*d* so as to insure an airtight sealing of kiln 30. Furthermore, it will bend slightly upwards or downwards when doors 166** are moved correspondingly.

Each cell 164 is a hollow longitudinal rectangular channel allowing the through-passage of a tray 46. FIG. 11 shows that cell 164 is delimited by elongated angle irons 190 at its four corners. Angle irons 190 are longitudinally installed in kiln 30 so as to provide support for trays 46 all along the length of kiln 30. FIG. 15 shows that each angle iron 190 is downwardly elbowed at 190*a* to provide a sloping access to cell 164 for tray 46. At its sloping portion 190*a*, angle iron 190 is thinner, since it does not support many trays 46 at a time, but only possibly a fraction of one tray 46. Also, angle iron 190 has a channelled cross-section, which could e.g. allow the passage of steam pipes.

Once tray elevator 130 is facing its desired cell 164, i.e. the one in which tray 46 is to be inserted, and that door 166 is opened by door opening device 174, pusher frame 162 advances due to the driving force of rack cogwheel 163 and pusher surface 162*b* bears on tray 46 rear surface to gradually insert it into cell 164, thus simultaneously inserting the green concrete blocks inside kiln 30 for curing. Tray 46 will be longitudinally supported by its two sides on angle irons 190.

As already stated, trays 46 are inserted in kiln 30 in a consecutive longitudinal linear abutment fashion. Each time a tray 46 is inserted in a cell 164 at kiln infeed end 30*a*, all trays 46 move farther towards kiln discharge end 30*b* because they push one another under the pressure imposed by pusher frame 162 of elevator-pusher 28. FIGS. 17 and 18 shows that peripheral frame 46*a* of trays 46 forms upwardly-projecting flanges 46*e* at both front and rear ends of tray 46 for a stable abutment of one tray 46 on the other. Flanges 46*e* have complementary outer surfaces, e.g. in this case they are flat, which is the most practical shape. Flanges 46*e*, which are relatively high, will abut one against the other when two trays 46 come into contact, and this prevents trays 46 from overlapping one another and thus damaging concrete blocks 42. Indeed, concrete blocks 42 are soft when they exit the molding machine, and are thus easily damageable. Shorter side flanges also prevent the pallets from sliding off the tray, as shown in FIG. 18.

Retaining wheels 170 play an important role during the insertion of tray 46. Indeed, since cell 164 is likely to be full of trays 46 along its length (except for an empty space at its discharge end), the pressure applied by pusher frame 162 on tray 46 is important, considering the weight of each tray 46 loaded with fifteen concrete blocks 42. Therefore, to prevent elongated vertical elevator-pusher 28 from tilting backwards (relative to kiln 30) and possibly falling to the floor due to this high pushing pressure, retaining wheels 170, as shown in FIG. 12, engage rails 168 on the interior surface (relative to kiln 30) of their flanges 168*b* to retain elevator-pusher 28. Furthermore, retaining wheels 170 engage rails 168 on opposite flanges 168*b*, relative to their web 168*a*, to make sure that tray 46 will be correctly aligned with cell 164 when it is inserted.

At kiln discharge end 30*b*, elevator-puller 32 pulls out trays 46 one after the other, at the same rhythm than they are inserted in kiln 30 by elevator-pusher 28. The blocks 42 retrieved from kiln discharge end 30*b* are cured and consequently hard, now that they have spent the required time inside kiln 30.

Elevator-puller 32 is very similar to elevator-pusher 28, except for two differences.

The first difference is that puller frame 162' (FIG. 10) does not define a surface at its free end, but is equipped with an electrically controlled hydraulic cylinder 192 whose cylinder rod 192*a* is linked at its free end to a puller handle 194 rotatably fixed at its intermediate portion 194*a* to puller frame 162'. When hydraulic cylinder 192 is activated, it either pulls or pushes its cylinder rod 192*a*, which in turn tilts puller handle free end 194*b* either upwards or downwards, respectively. To retrieve a tray 46 from a cell 164, elevator-puller 32 proceeds in the inverse way than elevator-pusher 28 for inserting them, except that once door 166' is opened by door opening device 174', puller frame 162' moves towards tray 46 and puller handle 194 tilts downwards (position shown in dotted lines in FIG. 10) until it abuts against tray 46 with its intermediate portion 194*a*. Then puller handle 194 tilts upwards and consequently engages tray through way 46*c* (position shown in full lines in FIG. 10). Puller frame 162' moves backwards, puller handle pulling tray peripheral frame 46*a* and therefore tray 46 out of kiln 30 and onto tray elevator 130' of elevator-puller 32. Tray 46 is deposited on tray conveyor 38 near its upstream end 38*a* by tray elevator 130'.

The second difference is that flanges 168*b'* of rails 168' are not engaged by retaining wheels 170' on their interior surface (relative to kiln 30) but on their exterior surface, as shown in FIG. 13. This is desirable because elevator-puller 32 will not have the tendency to tilt or stagger away from kiln 30 but towards kiln 30 when pulling a tray 46, so it will partially bear upon retaining wheels 170' for lateral support. Web 168*a'* of rail 168' at kiln discharge end 30*b* is therefore shorter than web 168*a* at kiln infeed end 30*a* of rail 168, because retaining wheels 170' need not engage rail 168' between its flanges 168*b'* and fixing plate 176'.

After having been loaded on tray conveyor 38, trays 46 are carried to tray stripper 26.

Figure 2A:
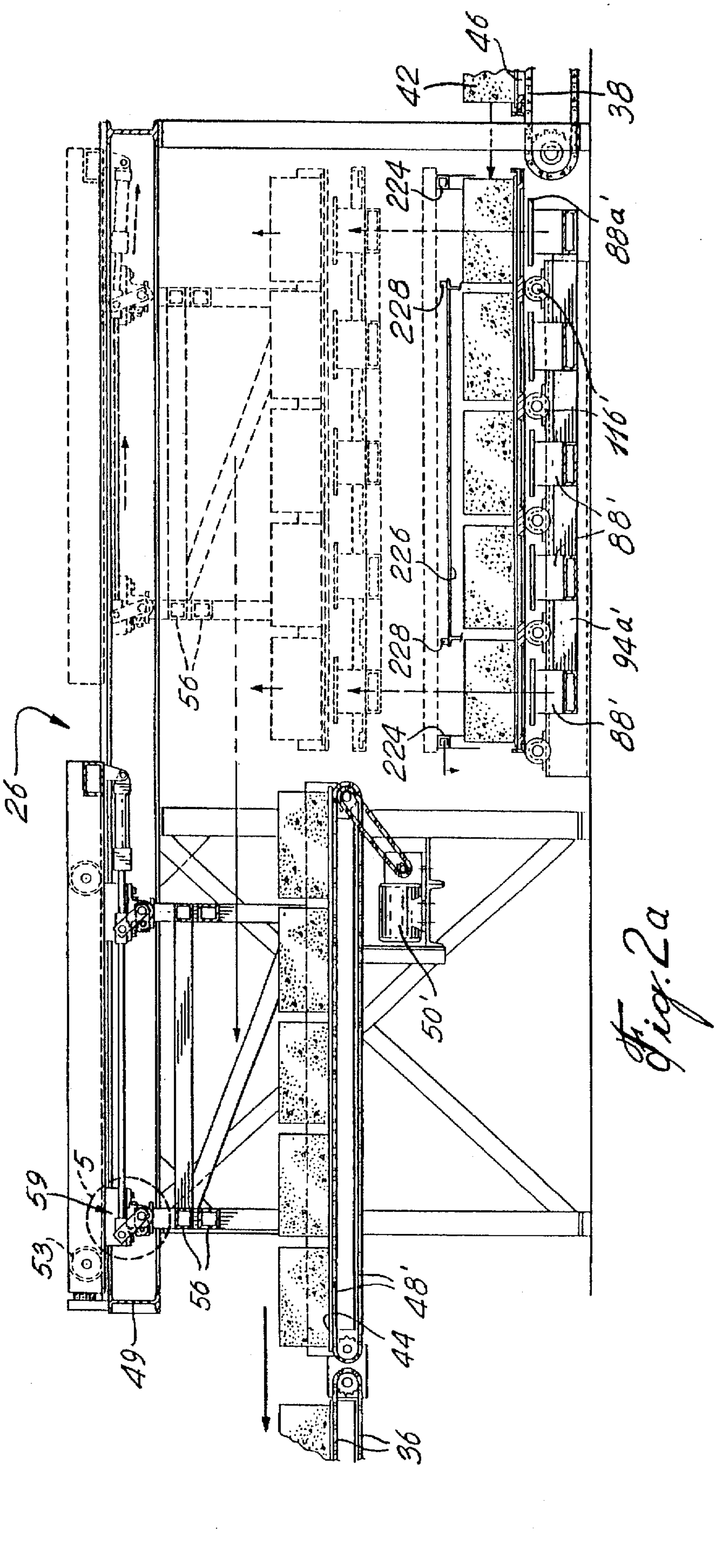

Tray stripper 26 is very similar to tray loader 24, but its function is to unload, or strip, pallets 44 from trays 46. FIG. 2*a* shows that trays 46 arrive on tray conveyor 38 and are discharged on a plurality of spaced transversely aligned (relative to elongated tray 46) and electrically controlled rollers that position tray 46 over a block base 94*a'* similar to block base 94*a* of tray loader 24. Block base 94*a'* is lifted by a block elevator 198, illustrated in FIGS. 3 and 7, from a lower position to an upper position (as with block elevator 94 of tray loader 24) shown in dotted lines and in full lines, respectively. Again, support blocks 88' that define support plates 88*a'* will pass in through ways 46*c* of trays 46 to bear on the lower surface of pallets 44 and lift them upwards, while block base 94*a'* will lift tray 46 spaced from pallets 44.

Pallet holder 52' (similar to those of tray loader 24 and illustrated in FIG. 3) will horizontally move over pallets 44, its upholding members 54*a'* placing themselves under the protruding extremities of pallets 44. Pallet holder 52' then slightly lifts pallets 46 from support blocks 88' and moves downstream, as suggested with arrows in FIG. 2*a*, over a pallet accumulator-conveyor 48'. Pallet holder 52' then lowers pallets 44 onto accumulator-conveyor 48', which carries pallets 44 to pallet conveyor 36. Pallet holder 52' again moves upstream to carry another load of pallets 44.

Accumulator-conveyor 48', driven by an independent electric motor 50', is slower than pallet conveyor 36 as is accumulator-conveyor 48. The two have the same relative speed, compared to pallet conveyor 36. Pallets 44 are thus accelerated when discharged on accumulator-conveyor 48', and the distance between each of them is increased when the change of conveyor occurs. This way, pallets 44 are separated by the same distance on pallet conveyor 36 at its upstream end 36*a* and its downstream end 36*b*.

Block elevator 198 is different from block elevator 94, as can be observed on FIGS. 3 and 7. Block elevator 198 is mounted on a lift frame 200 securingly and stably attached to floor F. An electrically controlled cylinder rod 202 is fixedly attached to block elevator 198 at its upper extremity and axially engages a hydraulic cylinder 204 at its lower extremity. When driving shaft 202 is driven upwards, it carries block elevator 198 with it until block base 94a' is approximately at the same level as accumulator-conveyor 48'. Guide wheels 206 are provided to ensure a straight vertical path to block elevator 198.

This version of the block elevator 198 is of course simpler than block elevator 94. For instance, hydraulic cylinder 204 can rest on floor F, while hydraulic cylinder 100 hangs up side down higher than floor level. Also, lift frame 200 is much smaller than lift frame 92. All this is due to the fact that the trays 46 have to be passed from tray stripper 26 to tray loader 24 transversely, relative to their longitudinal axes, whereas tray loader 24 has to receive tray 46 transversely through its lift frame 92. This is why lift frame 92 is much larger than lift frame 200, and also why the system of the block elevator 94 of tray loader 24 is more complex than the system of the block elevator 198 of tray stripper 26.

Tray conveyor 38 takes a different form for the passage of trays 46 from tray stripper 26 to tray loader 24. This form is explained hereafter.

FIG. 3 shows that one pair of horizontal coplanar lower conveyor rails 208 and one pair of horizontal coplanar upper conveyor rails 210 are fixedly installed from tray loader main frame 49 to tray stripper main frame 49'. Two similar carriage apparatus 212 (one of which is shown on FIG. 3) are each mounted on one set of conveyor rails 208, 210 by means of a plurality of guide wheels 214 so as to be movable along conveyor rails 208, 210. At least-one pair of guide wheels 214 is electrically controlled so as to play the role of driving wheels as well to carry carriage apparatus 212 along conveyor rails 208, 210. Carriage apparatus 212, 212 always move together and are movable between a stripper position (shown in full lines in FIG. 3), adjacent tray stripper main frame 49', and a loader position (shown in dotted lines in FIG. 3), adjacent tray loader main frame 49.

Carriage apparatus 212 has a carriage frame 212a that is generally U-shaped in cross-section and thus defines a vertical relatively wide rectangular slot 212b at its mid portion. Carriage frame 212a rotatably supports guide wheels 214. Carriage apparatus 212 further defines a hydraulic jack 216 whose jack rod 216a is rotatably linked at its free end to a V-shaped bar 218 rotatably fixed at its intermediate portion 218a (where it elbows) to carriage frame 212a. V-shaped bar 218 is also slidably engaged at its extremity between two horizontal guide-rails 220 fixedly attached to a rectangular piston 222 correctly dimensioned and adapted to engage vertical rectangular slot 212b between four guide-wheels 223. When jack rod 216a is pulled or pushed, piston 222 goes up or down, respectively, due to the link of V-shaped bar 218. When piston 222 is at its lowermost position, its upper surface is level with carriage frame 212a upper surface, while it protrudes upwardly beyond carriage frame 212a when at its uppermost position.

A conveying rod 224 (FIGS. 2a and 3) is fixedly anchored at its center portion on each piston 222 upper surface. The length of conveying rod 224 is more than twice the width of one tray 46. The reasons for this particular length will become clear hereafter. Since conveying rod 224 rests on piston 222, the former will move upwards and downwards as piston 222 will be vertically translated, conveying rod 224 moving between an upper position (shown in FIG. 3 and 7) several inches over carriage frame 212a and a lower position level with carriage frame 212a.

Between the two carriage apparatus 212, 212 and between tray stripper 26 and tray loader 24 is positioned a horizontal rectangular buffer frame 226 defining a stripper end near tray stripper 26. Buffer frame 226 is securingly anchored to floor F at each of its four corners by vertical segments (not shown). Buffer frame 226 is vertically positioned at an intermediate level between the lower and the upper positions of conveying rod 224. A pair of spaced upwardly extending short fingers 228 (FIGS. 2a and 3) are fixedly anchored to buffer frame 226 at its stripper end.

After pallet holder 52' has taken pallets 44 off supports blocks 88', block elevator 198 lowers again towards its lower position to receive another tray 46 full of pallets 44. However, while block elevator 198 was at its upper position, carriage apparatus 212 translated from its loader position to its stripper position, thus translating also conveying rods 224, 224 so that their first half 224a (FIG. 3) now extends under tray 46, in the through way defined by tray stripper main frame 49'. FIG. 2a suggests that rods 224, 224 are spaced enough to allow free vertical passage of block elevator 198, but not of tray 46. Therefore, when block elevator 198 moves from its upper position to its lower position, empty tray 46 is deposited on the first half 224a of rods 224, 224. Conveying rods 224, 224 are at their upper position when the are loaded with a tray 46.

At this stage, there is also an empty tray 46 on their second half 224b (FIG. 3), and it will be seen hereafter why it is so.

Carriage apparatus, once empty tray 46 has been deposited on its conveying rods 224, 224, translates from its stripper position to its loader position, thus positioning the tray 46 that is on the second half 224b of conveying rods 224, 224 in the through way defined by the tray loader main frame 49, thus over block elevator 94. Piston 222 is lowered by hydraulic jack 216 and consequently conveying rods 224, 224 are lowered to their lower position.

Tray 46 defines thicknesswise grooves 46f (shown in FIG. 18) that are situated on its lower surface at the four corners of its peripheral frame 46a. These grooves 46f are adapted to be engaged by the free end 106b of rotatable fingers 106 of the tray holder of tray loader 24, since the height of sustaining rods 104 is correctly dimensioned to permit this engagement when conveying rods 224, 224 are at their lower position. Therefore, fingers 106 pivot to sustain tray 46 vertically, and the two fingers 106 that are nearest tray stripper 26 will retain tray 46 when carriage apparatus 212 translates back towards its stripper position. Therefore, the tray 46 that was on the second half 224b of conveying rods 224 will stay on fingers 106 to be picked up by block elevator 94.

When carriage apparatus 212, 212 translate to their loader position, the tray 46 on the first half 224a of conveying rods 224, 224 moves from under tray stripper main frame 49' to an intermediate position between tray stripper 26 and tray loader 24. By lowering conveying rods 224, 224 to their lower position and then by moving carriage apparatus towards its stripper position, the tray 46 (the only one at that moment on conveying rods 46) abuts against vertical fingers 228 of buffer frame 226 which now vertically extend beyond the plane of conveying rods 224, 224, and conveying rods 224 slide under tray 46 which partially rests on buffer frame 226. When the first half 224a of conveying rods 224, 224 is again positioned under tray stripper main frame 49', the tray 46 has translated, relative to conveying rods 224, 224, from their first half 224a to their second half 224b.

Conveying rods 224, 224 are elevated to their upper position, ready to receive another tray 46 on their first half 224a and to convey the tray 46 on their second half 224b to tray loader 24, thus starting their cycle another time.

FIG. 1 shows that pallets 44, once discharged at upstream end 36*a* of pallet conveyor 36, will be stripped from their dry concrete blocks at the conventional pallet stripper 34 and return to the block molding machine 22 to receive new green blocks and start the cycle once again. The dry blocks are conveyed to packaging by a dry block conveyor 40.

We claim:

1. In combination, a plurality of rectangular article-carrying pallets of equal size and at least a first and a second tray for carrying said article-carrying pallets, each said tray comprising a rectangular frame having a longitudinal axis and defining a bottom load-bearing wall having a flat lower surface and an upper surface, two sides and two ends, end flanges upstanding from said upper surface along said ends with said upper surface defining a flat plane between said end flanges, said end flanges normal to said longitudinal axis and to said load-bearing wall, said tray dimensioned to receive on said upper surface up to a set number of said article-carrying pallets in side by side and contiguous positions, said end flanges defining flat, complementary outer surfaces extending upwardly from said load-bearing wall flat lower surface and being in direct, orthogonal relationship therewith for flat and stable abutment of the outer surface of one end flange of said first tray against the outer surface of one end flange of said second tray to prevent accidental overlapping of said first and second trays when said first tray pushes said second tray in the direction of their longitudinal axes.

2. The combination as defined in claim 1, wherein each said tray further includes side flanges upstanding from said sides.

3. The combination as defined in claim 1, wherein each said tray frame load-bearing wall further defines throughways partly underlying said pallets carried by said tray, said throughways enabling lifting, relative to said tray, of said set number of pallets from beneath said tray.

4. In combination, a concrete blocks handling and curing system, a plurality of rectangular article-carrying pallets of equal size adapted to be loaded with concrete blocks and a plurality of trays for carrying said rectangular pallets, each said tray comprising a rectangular frame having a longitudinal axis and defining a bottom load-bearing wall having a flat lower surface and an upper surface, two sides and two ends, end flanges upstanding from said upper surface along said ends with said upper surface being flat between said end flanges, said end flanges defining flat, complementary outer surfaces normal to said longitudinal axis, extending upwardly from said load-bearing wall flat lower surface and being in direct, orthogonal relationship therewith for flat and stable abutment of the outer surface of one end flange of a first said tray against the outer surface of one end flange of a second said tray to prevent accidental overlapping of said first and second trays when said first tray pushes said second tray in the direction of their longitudinal axes, said tray dimensioned to receive on said upper surface a set number of pallets in side by side and contiguous positions, said system comprising:

a) a tray loader, for loading said set number of pallets on each of said trays;

b) a kiln, for curing said concrete blocks;

c) kiln loading means, for loading said trays into said kiln;

d) kiln unloading means, for unloading said trays from said kiln;

e) a tray stripper, for unloading said pallets from said tray; and f) conveying means, for carrying said trays sequentially from said kiln unloading means to said tray stripper, to said tray loader and to said kiln loading means.

5. The combination as defined in claim 4, wherein each said tray frame load-bearing wall has a number of throughways partly underlying said pallets carried by said tray, said throughways enabling lifting, relative to said tray, of said set number of pallets from beneath said tray.

6. In combination, a concrete blocks handling and curing system and a plurality of trays for carrying rectangular pallets loaded with concrete blocks, each said tray comprising a rectangular frame having a longitudinal axis and defining an upper surface, two sides and two ends, end flanges upstanding from said upper surface along said ends with said upper surface being flat between said end flanges, said end flanges defining complementary outer surfaces normal to said longitudinal axis and to said frame, said tray dimensioned to receive on said upper surface a set number of pallets in side by side and contiguous positions, said frame having a number of throughways for partly underlying the pallets carried by said tray, said system comprising:

a) a tray loader, for loading a set number of the pallets on each of said trays;

b) a kiln, for curing said concrete blocks;

c) kiln loading means, for loading said trays into said kiln;

d) kiln unloading means, for unloading said trays from said kiln;

e) a tray stripper, for unloading the pallets from said tray; and f) conveying means, for carrying said trays sequentially from said kiln unloading means to said tray stripper, to said tray loader and to said kiln loading means; said tray loader comprising:

g) first accumulating means for accumulating said set number of pallets in contiguous fashion;

h) first elevating means vertically moveable between a first position and a second position, adapted to spacedly carry said pallets and deposit the pallets in the trays;

i) first loading means, for loading said set number of pallets from said first accumulating means onto said first elevating means; and j) first transfer means, for transferring said tray full of pallets from said first elevating means to said first conveying means.

7. The combination as defined in claim 6, wherein said tray stripper comprises:

a) a second accumulating means for accumulating said set number of pallets in an adjacent fashion and discharging said pallets in a spaced consecutive constant fashion;

b) second elevating means vertically movable between a first position and a second position, adapted to spacedly carry said tray and said pallets;

ca) first retractable tray holding means, for holding said tray in an intermediate position between said first and second positions of said first elevating means, said first tray holding means being retractable from the vertical path of said tray carried by said first elevating means;

c) second loading means, for loading said set number of pallets from said second elevating means onto said second accumulating means;

d) second retractable tray holding means, for holding said tray in an intermediate position between said first and said second positions of said second elevating means, said second tray holding means being retractable from the vertical path of said tray carried by said second elevating means; and e) second transfer means, for transferring said tray loaded with said set number of pallets onto said second elevating means.

8. The combination as defined in claim 7, wherein each of said first and second elevating means define a relatively flat base and a number of blocks equal to said set number of pallets, said blocks extending upwardly relative to the plane of said base and being fixedly anchored thereto, said blocks being adapted to pass through said throughways of said tray frame for abutting on said pallets, said base being adapted to support said tray under said pallets.

9. The combination as defined in claim 6, wherein said kiln defines a plurality of rows and columns, the intersection between one of said rows with one of said columns defining a cell, said cell being correctly dimensioned for longitudinally receiving a plurality of said trays carrying pallets loaded with concrete blocks, said kiln further defining an infeed end and a discharge end for respectively inserting and discharging said trays into said cells.

10. The combination as defined in claim 9, wherein said kiln loading means are adapted to receive one of said trays at a regular time interval and to load it into a first selected cell, said kiln loading means comprising an elevator-pusher having a generally vertical truss frame movable along said kiln infeed end, a tray elevator vertically movable along said truss frame and pushing means installed on said tray elevator, said tray elevator being adapted to pick up and vertically carry said one tray, said elevator-pusher positioning said one tray in front of said first selected cell, said pushing means inserting said one tray into said first selected cell.

11. The combination as defined in claim 10, wherein said kiln unloading means are adapted to unload one of said trays at a regular time interval from a second selected cell and to dispatch it onto said conveying means, said kiln unloading means comprising an elevator-puller having a generally vertical truss frame movable along said kiln discharge end, a tray elevator vertically movable along said truss frame and pulling means installed on said tray elevator, said tray elevator positioning said pulling means in front of said second selected cell, said pulling means pulling said tray from said second selected cell onto said tray elevator, said tray elevator vertically carrying and discharging said tray onto said conveying means.

12. The combination as defined in claim 10, wherein said kiln columns have a plurality of vertically stacked doors, one of said doors corresponding to each one of said cells at each one of said infeed and discharge ends, said elevator-pusher including door opening means which can open one of said doors at said infeed end corresponding to said first selected cell before said pushing means insert said tray into said first selected cell.

13. The combination as defined in claim 12, wherein said elevator-puller includes door opening means which can open one of said doors at said discharge end corresponding to said second selected cell before said pulling means retrieve said tray from said second selected cell.

14. The combination as defined in claim 13, wherein said elevator-puller further includes retaining wheels for engaging vertical rails fixedly anchored to said kiln, said retaining wheels retaining said elevator-puller from tilting towards said kiln when said pulling means retrieve said tray from said second selected cell.

15. The combination as defined in claim 12, wherein said elevator-pusher further includes retaining wheels for engaging vertical rails fixedly anchored to said kiln, said retaining wheels retaining said elevator-pusher from tilting away from said kiln when said pushing means insert said tray into said first selected cell.

* * * * *